(12) United States Patent
Azarfar et al.

(10) Patent No.: US 12,082,023 B2
(45) Date of Patent: Sep. 3, 2024

(54) RADIO RESOURCE MANAGEMENT IN WIRELESS NETWORKS WITH MULTIPLE ACCESS POINTS

(71) Applicant: Everest Networks, Inc., Mountain View, CA (US)

(72) Inventors: Arash Azarfar, Mountain View, CA (US); Samer Abielmona, Montréal (CA); Lambertus Verberk, Mountain View, CA (US)

(73) Assignee: Everest Networks, Inc., Fremont, CA (US)

( * ) Notice: Subject to any disclaimer, the term of this patent is extended or adjusted under 35 U.S.C. 154(b) by 596 days.

(21) Appl. No.: 17/271,986

(22) PCT Filed: Aug. 30, 2019

(86) PCT No.: PCT/US2019/048967
§ 371 (c)(1),
(2) Date: Feb. 26, 2021

(87) PCT Pub. No.: WO2020/047357
PCT Pub. Date: Mar. 5, 2020

(65) Prior Publication Data
US 2021/0352508 A1    Nov. 11, 2021

Related U.S. Application Data
(60) Provisional application No. 62/726,075, filed on Aug. 31, 2018.

(51) Int. Cl.
*H04W 24/10*    (2009.01)
*H04B 17/318*    (2015.01)
(Continued)

(52) U.S. Cl.
CPC .......... *H04W 24/10* (2013.01); *H04B 17/318* (2015.01); *H04W 60/04* (2013.01); *H04W 76/19* (2018.02)

(58) Field of Classification Search
CPC ..... H04W 24/10; H04W 60/04; H04W 76/19; H04W 24/02; H04W 24/08; H04W 48/20; H04B 17/318
See application file for complete search history.

(56) References Cited

U.S. PATENT DOCUMENTS 9,585,124 B2    2/2017  Diener et al.
10,595,185 B1*  3/2020  Chen ..................... H04W 24/08
(Continued)

FOREIGN PATENT DOCUMENTS

EP    2628348    8/2013

OTHER PUBLICATIONS

PCT International Preliminary Report on Patentability in International Appln. No. PCT/US2019/048967, dated Mar. 11, 2021, 21 pages.
PCT International Search Report and Written Opinion in International Appln. No. PCT/US2019/048967, dated Jan. 15, 2020, 30 pages.

*Primary Examiner* — Harry H Kim
(74) *Attorney, Agent, or Firm* — Fish & Richardson P.C.

(57) ABSTRACT

A wireless network includes wireless network devices each having at least one radio providing wireless services to wireless clients. A first wireless network device collects first information and first measurement from at least one client using the at least one radio in the first wireless network device. A second wireless network device is configured to collect second information and second measurements from the at least one client using the at least one radio in the second wireless network device. Either one or both of the first and second wireless network devices is configured to determine a score about the relationship between the at least (Continued)

one radio in the first wireless network device and the at least one radio the second wireless network device using at least the first information and the second information, and the first measurements and the second measurements.

11 Claims, 16 Drawing Sheets

(51) Int. Cl.
*H04W 24/02* (2009.01)
*H04W 24/08* (2009.01)
*H04W 48/20* (2009.01)
*H04W 60/04* (2009.01)
*H04W 76/19* (2018.01)

(56) References Cited

U.S. PATENT DOCUMENTS

| | | | |
|---|---|---|---|
| 11,051,216 B2 * | 6/2021 | Lee | H04W 24/10 |
| 11,412,562 B2 * | 8/2022 | Shimezawa | H04W 48/08 |
| 11,825,376 B2 * | 11/2023 | Ahn | H04W 4/02 |
| 2017/0135003 A1 * | 5/2017 | Suarez | H04W 28/0958 |
| 2017/0272317 A1 | 9/2017 | Singla et al. | |
| 2017/0280337 A1 | 9/2017 | Bahr | |
| 2018/0310240 A1 | 10/2018 | Kannan | |
| 2019/0215776 A1 * | 7/2019 | Kim | H04W 52/10 |
| 2020/0092743 A1 * | 3/2020 | Yang | H04W 48/18 |
| 2020/0221522 A1 * | 7/2020 | Shimezawa | H04W 76/15 |
| 2020/0236568 A1 * | 7/2020 | Yang | H04W 24/08 |

\* cited by examiner

RADIO RESOURCE MANAGEMENT IN WIRELESS NETWORKS WITH MULTIPLE ACCESS POINTS

CROSS-REFERENCE TO RELATED APPLICATIONS

This application is a National Stage application under 35 U.S.C. § 371 of International Application No. PCT/US2019/048967, having an International Filing Date of Aug. 30, 2019, which claims priority to U.S. Application Ser. No. 62/726,075, filed on Aug. 31, 2018. The disclosure of the prior application is considered part of the disclosure of this application, and is incorporated in its entirety into this application.

TECHNICAL FIELD

This application relates to the field of radio resource management in wireless networks including multiple wireless network devices, such as access points or base stations, each providing wireless access services to a multitude of client devices.

BACKGROUND

Wireless networks provide network connectivity to a multitude of wireless client devices through several wireless network devices. Those wireless network devices, also denoted as wireless access points (APs) or base stations (BS), are interconnected through a distribution system and share common radio frequency (RF) resources. Each AP can integrate one or more radios. Typically, a wireless client device selects a radio in an AP and establishes a wireless link with the radio according to a wireless network protocol such as the WLAN IEEE 802.11 (Wi-Fi) protocol or the cellular mobility long term evolution (LTE) protocol. The RF signals used to establish the wireless link are transmitted in the wireless channel assigned or selected by the radio.

In order to provide the best wireless connectivity quality of service (QoS) to the wireless client devices, radio resources must be properly managed. For example, wireless client devices will typically initially connect with the radio with the strongest received signal. As a wireless client device moves, the preferred radio changes and the wireless client device will roam to another radio. Alternatively, several radios can provide service to a same wireless client device but have different loads, interference or coverage pattern. The most appropriate serving radio must be selected for the wireless client devices. Those radio resource management (RRM) tasks are generally referred as wireless client device roaming and wireless client device load balancing, respectively.

Another radio resource management task required to provide good connectivity QoS is the assignment of wireless channels to radios. The assignment is done to mitigate interference between radios and wireless client devices. Another example of radio resource management task required to improve connectivity QoS is the identification of radios exhibiting anomalous behavior, including radio failures, and taking the appropriate corrective measures to improve connectivity QoS performance.

Another task performed in a wireless network is wireless positioning and wireless client device localization in order to support location-aware applications, such as augmented reality, personal tracking and marketing.

Several methods and algorithms exist for such radio resource management or other related tasks. However, in networks consisting of large number of radios with heterogeneous properties (radio capabilities, coverage area, etc.) those methods could be improved.

SUMMARY

This application discloses methods to perform radio resource management and monitoring in wireless networks including multiple wireless network devices such as an access point or base station. In particular, this application considers distributed methods to enable wireless network devices to discover other wireless network devices in the wireless networks with neighboring coverage by exchanging messages between the wireless network devices about radio and client measurements and parameters. The neighbor discovery process enables a convergence toward the most likely list of neighbors while evaluating all radios in the wireless network. The neighbor information can then be used to efficiently perform radio resource management task, such as client load balancing between the wireless network devices, channel assignment of wireless network devices, performance monitoring of wireless network devices, wireless network failure recovery, and wireless localization.

In a first embodiment, a wireless network includes a plurality of wireless network devices each including at least one radio configured to provide wireless services to wireless clients; and a distribution communication network for the wireless network devices to exchange information. A first wireless network device is configured to collect first information and first measurement from at least one client using the at least one radio in the first wireless network device. A second wireless network device is configured to collect second information and second measurements from the at least one client using the at least one radio in the second wireless network device. Additionally, either one or both of the first and second wireless network devices is configured to determine a score about the relationship between the at least one radio in the first wireless network device and the at least one radio the second wireless network device using at least the first information and the second information, and the first measurements and the second measurements.

The foregoing and other embodiments can each optionally include one or more of the following features, alone or in combination.

In a second embodiment according to the first embodiment, the client is connected with the at least one radio in the first wireless network device or the at least one radio in the second wireless network device.

In a third embodiment according to the first embodiment, the first information and the second information is a unique client identifier and is the same.

In a fourth embodiment according to the third embodiment, the unique client identifier is the client MAC address.

In a fifth embodiment according to the first embodiment, the first measurement is a first instance of the client receive signal strength (RSS) statistic collected by the at least one radio in the first wireless network device, and the second measurement is a second instance of the client RSS statistic collected by the at least one radio in the second wireless network device.

In a sixth embodiment according to the first embodiment, the score about the relationship between the radios in the first and second wireless devices increases when the radios in the first and second wireless devices have a stronger neighboring relationship.

In a seventh embodiment according to the first embodiment, the score about the relationship between the radios in the first and second wireless devices increases if the first and second information and measurements indicates that the client is in the coverage area of both radios in the first and second wireless devices.

In an eighth embodiment according to the first embodiment, the score is used to determine a list of neighbor radios for either the first wireless network device or the second wireless network device.

In a ninth embodiment according to the first embodiment, the first wireless network device is configured to send a first registration message to at least the second wireless network device. Additionally, the second wireless network device is configured to send to the first wireless network device, in response to the first registration message, the second information and second measurement about the at least one client.

In a tenth embodiment according to the ninth embodiment, the first wireless network device is configured to determine, based on the list of neighbor radios, a third wireless network device to which to send a registration message.

In an eleventh embodiment according to the first embodiment, the first wireless network device is configured to perform radio resource management tasks based on the score.

In a twelfth embodiment according to the first embodiment, the first wireless network device is configured to compute the score and determine that at least one radio exhibits an anomaly using the collected information using the score.

In a thirteenth embodiment according to the first embodiment, the first wireless network device is configured to compute the score and to determine the channel to assign to at least one radio using the score.

In a fourteenth embodiment according to the first embodiment, each of the wireless network devices is configured to perform, for each of its at least one radio, a plurality of client load-balancing algorithms. Here, each of the client load-balancing algorithms can include determining whether a radio should steer clients, and if so steering clients toward a target radio, and determining the target radio using the score.

In a fifteenth embodiment according to the first embodiment, the first wireless network device is configured to compute the location of the client device using a set of radios where at least one of the radios is determined by the first wireless network device using the score.

In a sixteenth embodiment according to the first embodiment, the first wireless network device is configured to compute the score and determine a target radio for client roaming using the score.

In a seventeenth embodiment according to the first embodiment, each of the wireless network devices is configured to perform, for each of its at least one radio, a plurality of self-recovery algorithms. Each of the self-recovery algorithms can include, if a radio experiences a failure, increasing, by at least one radio in a set, its coverage area. Here, the radios in the set are determined by the self-recovery algorithms using the score.

In an eighteenth embodiment, a wireless network includes a plurality of wireless network devices each including at least one radio providing wireless services to wireless clients. The wireless network devices are configured to perform operations which include establishing (i) a first cost of assigning a same channel to a radio in a first wireless network device and a radio in a second wireless network device, and (ii) a second cost of assigning different channels to the radio in the first wireless network device and the radio in the second wireless network device. The first cost is greater than the second cost. The first and second costs are a function of a neighbor relationship between the radio in the first wireless network device and the radio in the second wireless network device. The operations further include assigning, based on at least the first, and second costs, channels to the at least one radio in the first wireless network device and the at least one radio in the second wireless network device.

The foregoing and other embodiments can each optionally include one or more of the following features, alone or in combination.

In a nineteenth embodiment according to the eighteenth embodiment, the radio in the first wireless network device and the radio in the second wireless network device are configured to collect client information and measurements, and the first and second costs are function of the collected client information and measurements.

In a twentieth embodiment according to the eighteenth embodiment, the first and second costs monotonously increase with the neighboring relationship between radios.

In a twenty-first embodiment according to the eighteenth embodiment, the first and second costs are inversely proportional to a square of a distance between the first wireless network device and the second wireless network device.

In a twenty-second embodiment according to the eighteenth embodiment, the first and second costs are determined using information collected based on a list of neighbor radios.

In a twenty-third embodiment, a wireless network includes a plurality of wireless network devices each including at least one radio providing wireless services to wireless clients. Each of the wireless network devices is configured to perform, for each of its at least one radio, a plurality of client load-balancing algorithms. Each of the client load-balancing algorithms can include determining whether a radio should steer clients, and if so steering clients toward a target radio. The determining whether a radio should steer clients is performed differently for a first client load-balancing algorithm and for a second client load-balancing algorithm.

The foregoing and other embodiments can each optionally include one or more of the following features, alone or in combination.

In a twenty-fourth embodiment according to the twenty-third embodiment, the target radio for a client is specified in a radio neighbor list of a local radio.

In a twenty-fifth embodiment according to the twenty-third embodiment, the determining if a radio should steer clients is performed differently for a first client load-balancing algorithm at different time instants.

In a twenty-sixth embodiment according to the twenty-fifth embodiment, the determining if a radio should steer clients is modified as a function of an overload factor of a radio specified in a radio neighbor list.

In a twenty-seventh embodiment, a wireless network includes a plurality of wireless network devices each including at least one radio configured to provide wireless services to wireless clients; a wireless network controller; and a distribution communication network for the wireless network devices and the wireless network controller to exchange information. A first wireless network device is configured to collect first information and first measurement from at least one client using the at least one radio in the first wireless network device and transmit the collected first information and first measurement to the wireless network controller. A second wireless network device is configured to collect second information and second measurements from the at least one client using the at least one radio in the second wireless network device and transmit the collected second information and second measurement to the wireless network controller. Additionally, the wireless network controller is configured to determine a score about the relationship between the at least one radio in the first wireless network device and the at least one radio the second wireless network device using at least the first information and the second information, and the first measurements and the second measurements.

The foregoing and other embodiments can each optionally include one or more of the following features, alone or in combination.

In a twenty-eighth embodiment according to the twenty-seventh embodiment, the wireless network controller is configured to determine that at least one radio exhibits an anomaly using the collected information using the score.

In a twenty-ninth embodiment according to the twenty-seventh embodiment, the wireless network controller is configured to determine the channel to assign to at least one radio using the score.

In a thirtieth embodiment according to the twenty-seventh embodiment, the wireless network controller is configured to perform a self-recovery algorithm. The self-recovery algorithm can include if a radio experiences a failure, at least one radio in a set will increase its coverage area, and the radios in the set are determined by the self-recovery algorithm using the score.

Details of one or more implementations of the disclosed technologies are set forth in the accompanying drawings and the description below. Other features, aspects, descriptions and potential advantages will become apparent from the description, the drawings and the claims.

Certain illustrative aspects of the disclosed technologies are described herein in connection with the following description and the accompanying figures. These aspects are, however, indicative of but a few of the various ways in which the principles of the disclosed technologies may be employed and the disclosed technologies are intended to include all such aspects and their equivalents. Other advantages and novel features of the disclosed technologies may become apparent from the following detailed description when considered in conjunction with the drawings.

DETAILED DESCRIPTION

Figure 1:
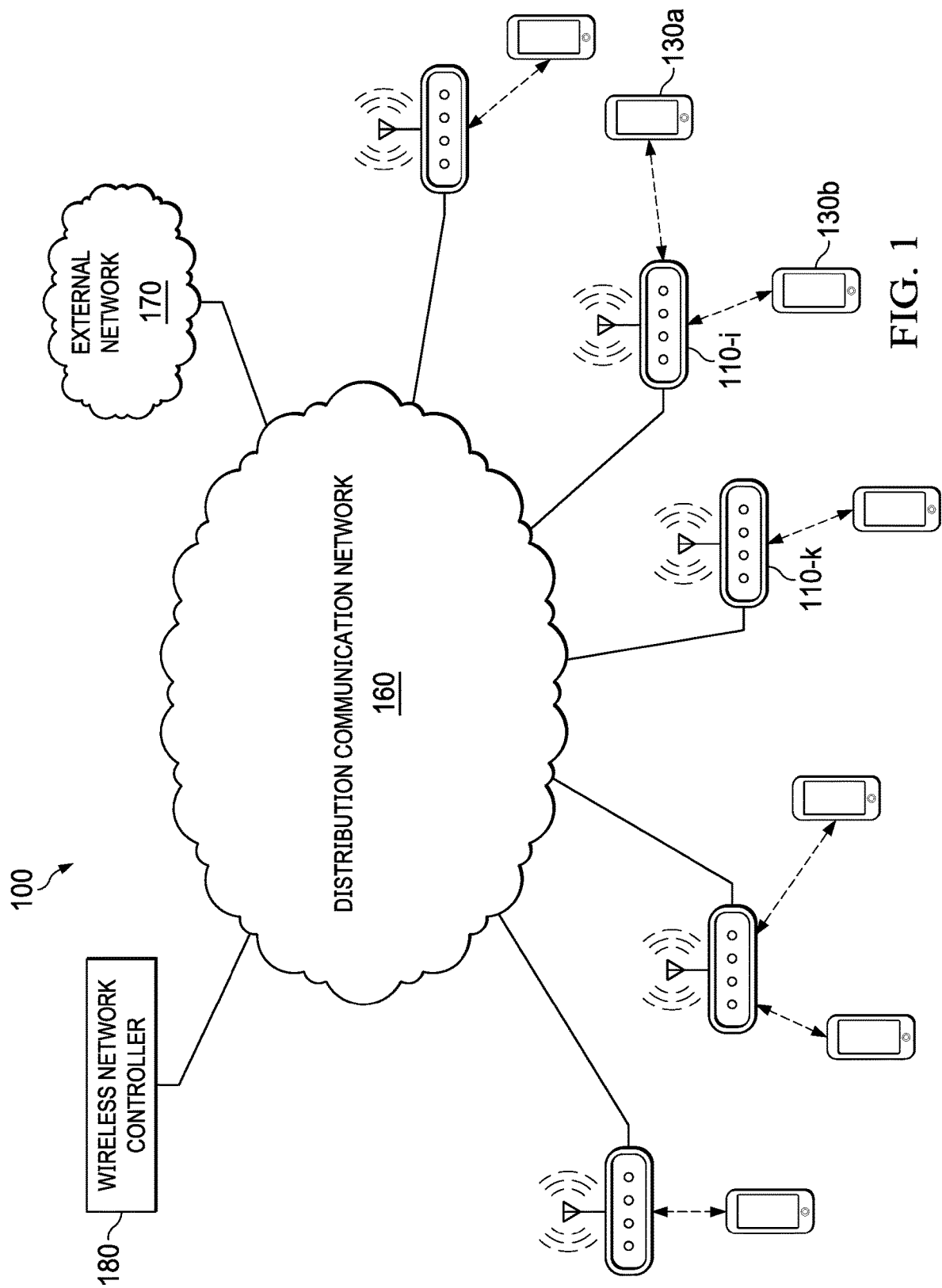
FIG. 1 is a diagram of a wireless network in accordance with the disclosed technologies.
Figure 2:
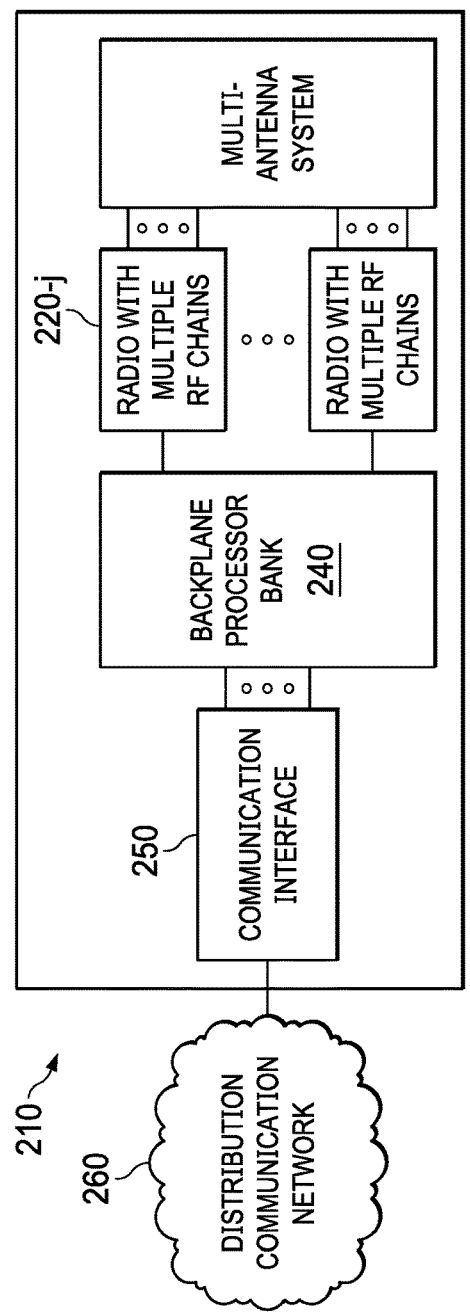
FIG. 2 is a diagram of a multi-radio wireless network device in accordance with the disclosed technologies.

FIG. 1 shows a wireless communication network 100 including multiple wireless network devices 110-$i$ (also referred as access points (APs)) i=1, ..., I. FIG. 2 shows a typical implementation of an AP 210. An AP 110-$i$, 210 includes one or more radios 220-$j$, where j=1, ..., J$_i$, each radio including one or more radio RF transceiver chains (example of such radios include MIMO and MU-MIMO radios). A particular radio 220-$j$ in an AP 110-$i$ will also be denoted by radio 220-$(j,i)$. Each RF transceiver chain attached to a same radio transmits or receives RF signals in the same wireless channels. A wireless channel is defined by the RF spectrum bandwidth centered at a carrier frequency. The wireless channels can be adjacent or non-contiguous. For clarity, in the following we will assume that RF signals transmitted from the multiple RF chains attached to a single radio are transmitted in a single contiguous wireless channel. The RF signals are coupled to one or more antenna elements and are radiated over the wireless medium. The coupling between the RF signals and antenna elements can be fixed or reconfigurable. The RF signals can be radiated according to a directional radiation pattern or an omni-directional pattern. Furthermore, the radiation pattern can be fixed or reconfigurable.

Each radio 220-$(j,i)$ in the wireless network device 110-$i$ communicates data according to a wireless communication protocol, such as those specified by IEEE 802.11 (Wi-Fi), LTE (and it's variants, LTE-U, MuLTEfire, etc.), IEEE 802.15.4 (Zigbee), Bluetooth, and/or other type of wireless communication protocols. Different radios 220-$(j,i)$, 220-$(k \neq j, i)$ can operate according to different user desired protocols. The radios can also be multiple protocol capable, to be reconfigured to operate using different communication protocols. Each radio is capable of providing simultaneous wireless services to multiple wireless client devices 130$a$, 130$b$. The simultaneous services can be provided by simultaneous transmission of RF signals (e.g., MU-MIMO or OFDMA transmission) or at different time instants or by other multiplexing means. In the discussion that follows, for clarity, IEEE 802.11 is often used as an illustrative example. However, this does not restrict the scope of the disclosed technologies and their applicability to particular radios or particular communication protocols.

The AP 110-$i$, 210 further includes one more processors in a processor bank 240 attached to the radios 220-$j$ and a communication interface 250. The processors are used to implement various functions such as, but not limited to, part of the wireless protocols, monitoring and configuration of radio parameters and functions to communicate with other entities in the wireless communication network 100.

The APs 110-$i$, 210 are connected to a distribution communication network 160, 260 through the communication interface 250. The communication interface 250 provides means to the processors in the processor bank 240 and the radios 220-$j$ to receive and transmit information and data in the distribution communication network 260.

The distribution communication network 160, 260 can employ a mixture of transmission links such as wired links and wireless links. The distribution communication network 160, 260 provides means to an AP 110-$i$, 210 to transmit and receive information from an external network 170 and other devices connected to the distribution communication network, such as another AP 110-$k \neq i$, or a wireless network controller 180. A wireless network controller 180 is an optional device that can be used to configure, control and monitor the APs 110 in the wireless communication network 100. For convenience, FIG. 1 shows the wireless network controller 180 attached to the distribution network but the wireless network controller 180 can also be part of the external network 170.

Wireless mobile stations 130$a$, 130$b$, etc., (also referred to as client devices or stations) employ the wireless communication network to transmit and receive information. Example of wireless mobile station 130 include, but are not limited to, phones, smartphones, laptops, tablets, etc. In order to transmit and receive information, a wireless mobile station 130 needs to be connected or associated with at least one radio 220. In the following, for clarity, we will assume that a wireless mobile station 130 is associated to only one radio 220.

Figure 3:
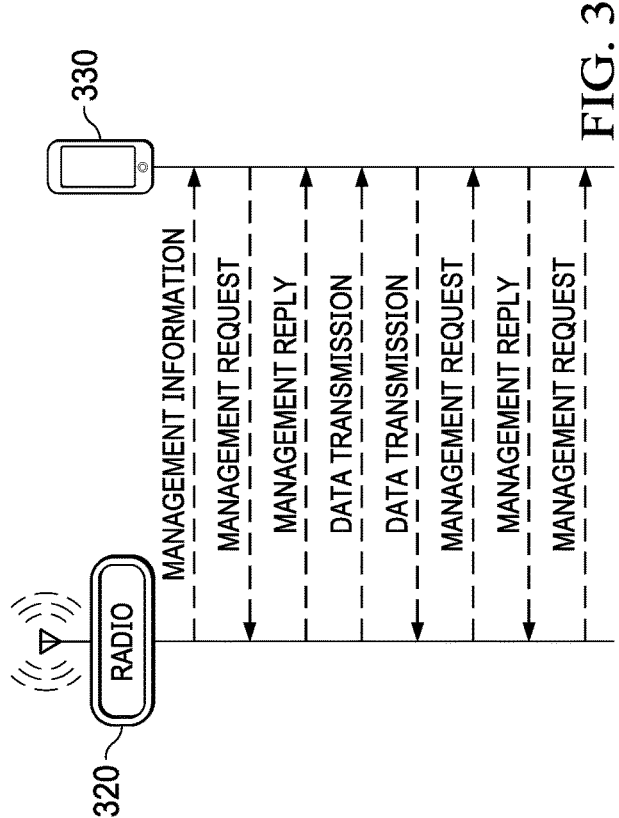
FIG. 3 shows aspects of communications between a wireless radio and a wireless client device in accordance with the disclosed technologies.

FIG. 3 shows that a radio 320 and a wireless mobile station 330 exchange messages according to the wireless communication protocol employed by the radio 320. Here, various messages can be exchanges depending on the protocol. In the following, we will explain a few messages that can be exchanged using the Wi-Fi (IEEE 802.11) protocol as an example. A radio 320 regularly transmits management information in a beacon frame. This information includes the capabilities of the radio. Wireless mobile stations 330 within the coverage area of the radio 320 and listening to the channel used by the radio 320 will receive and decode the beacon frame. A wireless mobile station 330 can determine if the capabilities, including the provided wireless services, correspond to the station capabilities and requirements. The wireless mobile station 330 can also determine the signal quality, such as the receive signal strength (RSS), of this radio 320.

A wireless mobile station 330 can also initiate a management information exchange with a radio 320. For example, a probe request can be sent to a radio 320 and the radio 320 may reply with a probe response which includes information about the radio capabilities and which can also be used by the wireless mobile station 330 to determine the signal quality of this radio 320. Another example of management information exchange initiated by a wireless mobile station 330 is an association request send from a wireless mobile station 330 to a radio 320. If the radio 320 accepts the association request, it sends a positive association response. An authentication phase can then take place. Following a positive association request and authentication, the radio 320 becomes the wireless mobile station serving radio (also referred as the wireless mobile station local radio) and the wireless mobile station 330 can then receive and transmit data through the serving radio.

Once a wireless mobile station 330 is connected to a radio 320, further management exchanges can take place. For example, a management request, such as an 802.11k measurement management request, can be sent from the radio 320 to the wireless mobile station 330 instructing the later to measure and report to the radio 320 the measured signal quality from other radios. The radio 320 can also send a request, such as an 802.11v basic service set transition management request, to a wireless mobile station 330 instructing the later to associate with another radio. The radio 320 can also send a disassociation management frame to indicate to a wireless mobile station 330 that it will be disconnected from the radio 320.

Note that probe requests and association requests received from a wireless mobile station 330 can also be used by a radio 320 to determine the signal quality from this wireless mobile station 330. Furthermore, any received data frames and management frames can be used by both the radio 320 and wireless mobile station 330 to monitor the wireless signal quality. For any received data, the wireless signal quality can be monitored, for example, based on the received signal strength, the receive and transmit physical data rate, the interference level, etc.

A wireless network 100 employs radio resource management (RRM) techniques to optimize its performance. Various techniques for optimizing the performance of the wireless network 100 in accordance with the disclosed technologies are described below. A first technique referred to as (AP initiated) client roaming is employed to transition or steer a client association to a radio providing a better signal quality than the current client serving radio. This will occur if a client is mobile and doesn't request a re-association with another radio when it moves away from the current serving radio, even if the serving signal deteriorates. This problem is also referred to as the sticky client problem. Client load balancing (CLB) is another RRM technique used to associate a client with the radio which can provide the best service. That is, a client will typically associate with the radio with the strongest RSS. However, this radio can be or may become overloaded with a large number of wireless mobile stations. In this case, the mobile station might receive a better service from another radio with a lower load and adequate wireless link to the wireless mobile station than the wireless service received from the client current serving radio. The CLB algorithm identifies such instances and appropriately transitions or steers the client to a better serving radio.

Another RRM task relates to the assignment of channels to various radios to minimize interference between the channels. Other physical parameters that can be configured in RRM also include, but are not limited to, the radio transmit power and the radio RF coverage configuration. Another RRM task includes the monitoring of radio statistics, including, but not limited to, the RSS and rate of the associated clients, the interference level, the channel utilization, the number of associated clients, the amount of transferred data, the aggregate throughput, etc. This monitoring can be used to identify radios that exhibit behavior requiring further adjustment of the radio parameters or exhibiting abnormal behavior.

Another task often performed in wireless networks is wireless positioning and client localization. For this aim, the station's signal will be tracked on a subset of radios which hear this station. Another task is self-recovery and self-healing of wireless networks. For example, if a radio fails, then the wireless network will suffer from a coverage hole. Note that "to fail" or "to experience a failure" are used interchangeably. By increasing the transmission power or changing their coverage area, other radios should try to shrink the coverage hole.

Several RRM tasks are improved with an accurate knowledge of a radio neighbors. For example, transition request can be sent to a wireless mobile station indicating some or all of the radio neighbors as part of client roaming or CLB procedures. Different channels can be assigned to neighboring radios, or radio statistics can be compared to the statistics of the neighboring radios to detect anomalous behavior. The neighbors of the serving radio can be considered as the best candidates to monitor a client signal and improve its localization accuracy. The determined neighbor set of a broken radio may also automatically detect the loss of a radio or are instructed by the wireless controller 180 to increase their transmission power or change their coverage area.

Determining the set of neighbors to a radio is a challenging task in a wireless communication network 100, which includes a large number of APs 110. Different approaches can be employed. For examples, all radios in a single AP can be considered as neighbors. Also, information about the radio geographical location, which could be obtained by measurements, such as GPS or manual entries by a network manager, can be used to determine neighbors using the distance between radios. Information about the RF propagation environment and radio coverage (antenna pattern and orientation) can further be employed to determine neighbors. Another approach requires a radio to monitor different channels and listening for management beacon frames transmitted by other radios. Based on the RSS of the received beacons, a radio can then determine its neighbors.

Figure 4:
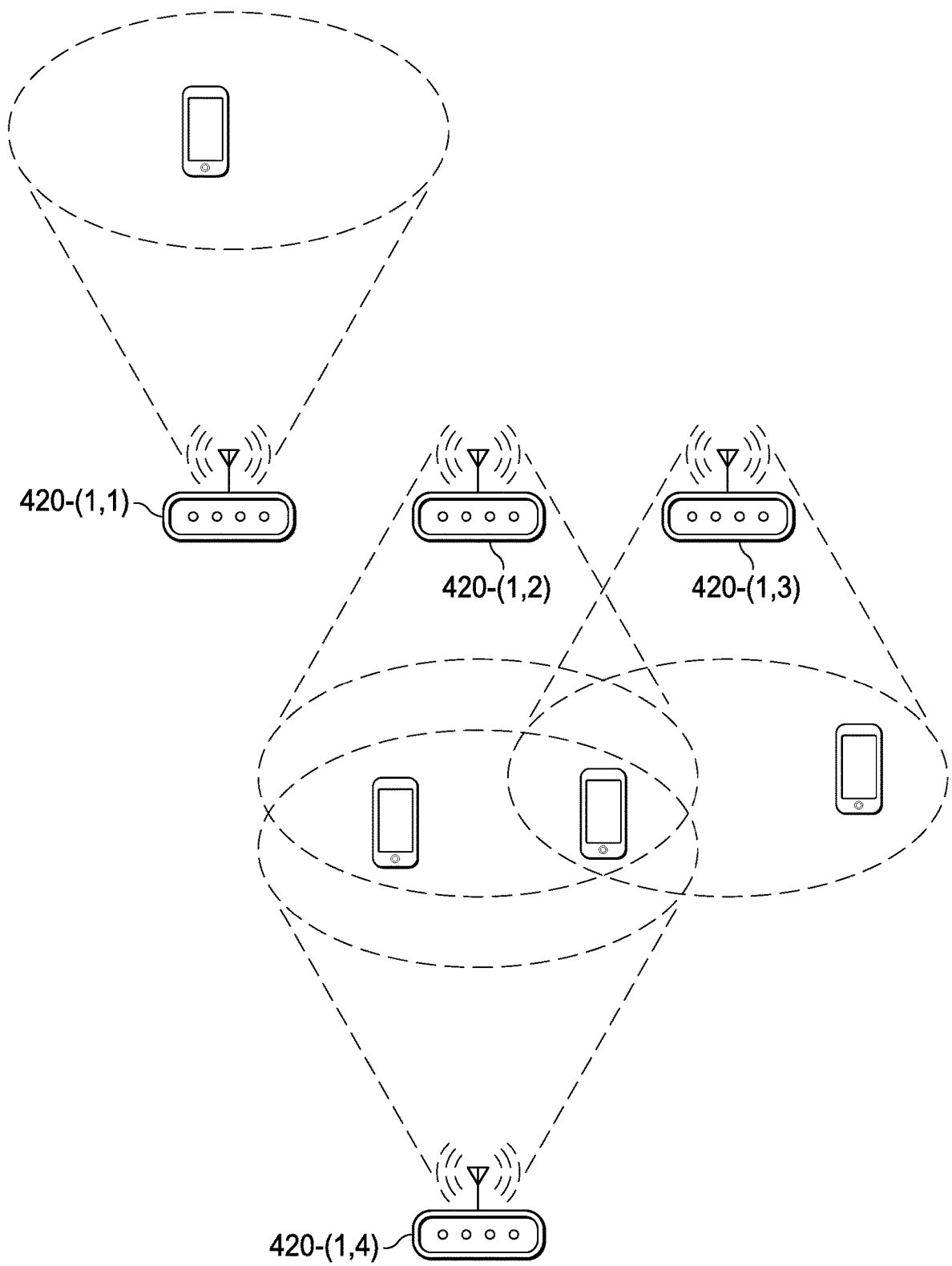
FIG. 4 shows aspects of neighbor determination in accordance with the disclosed technologies.

However, as shown in FIG. 4, neighbor determination based solely on geographical location, including radios inside the same AP, can lead to a misidentification of neighbors. That is, radios should have neighboring coverage areas to be considered as neighbors for several RRM tasks. Coverage areas are correlated to the radio location but also depends on other factors, such as, the antenna radiation pattern and orientation. For example, two radios 420-(1,1), 420-(1,2) that are in adjacent APs can have different coverage areas because they employ directional antennas oriented in different directions and should not be considered as neighbors for several RRM tasks. Inversely, two radios 420-(1,2), 420-(1,3) that are in adjacent APs or two radios 420-(1,2), 420-(1,4) that are far apart can have overlapping coverage areas and should be considered as neighbors for several RRM tasks. Furthermore, a radio geographical location and/or its coverage area might not be available. For similar reasons, a radio monitoring a channel might not receive the beacon from a radio with a neighboring coverage because both employ a directional antenna, but they can have overlapping or adjacent coverage areas and should be considered as neighbors for several RRM tasks.

A method is described next which can identify neighbors based on their coverage area. Further, this method is distributed, which is a useful property for large wireless networks, and doesn't require manually entered information or external geographical information such as GPS.

Figure 5:
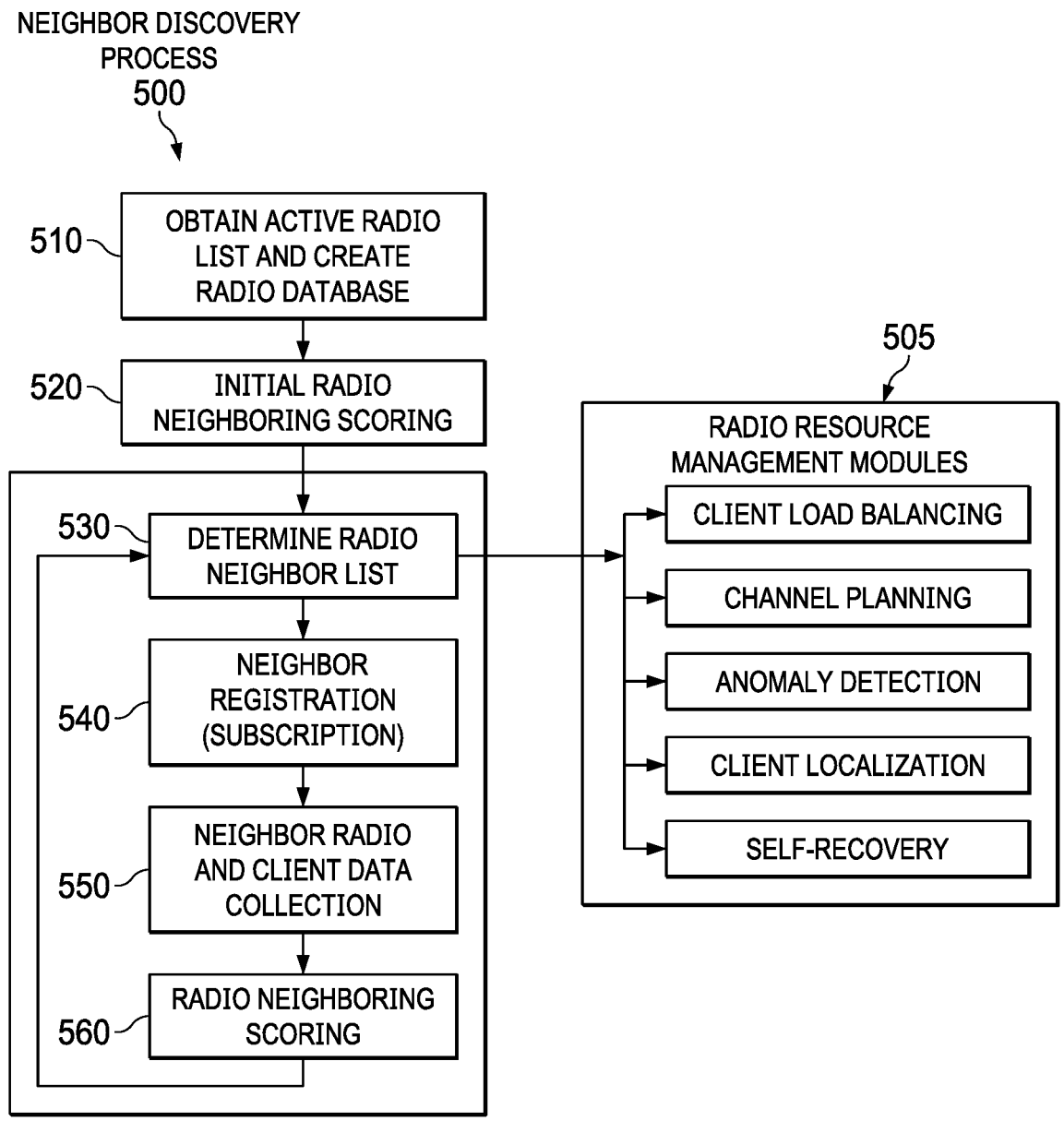
FIG. 5 shows a neighbor discovery process.

FIG. 5 shows an example of a high-level flow diagram of a neighbor discovery process 500 and its interaction with RRM algorithms 505 (also referred to as RRM modules). This flow diagram is implemented in the processor bank 240 of each AP 110-*i* 210 in the wireless network 100. For each AP 110-*i*, 210, different instances of the neighbor discovery process 500 can be implemented for each radio 220-*j* in the AP or a single instance can be implemented for multiple or all radios j=1, ..., J$_i$. The set of one or more radios for which the neighbor discovery process 500 is instantiated are called the local radios and the objective of the neighbor discovery process 500 is to determine for this set of local radios the most likely radio neighbors, excluding the set of local radios or the other radios in the same AP, in the wireless network 100. In the following we will assume for clarity, but without loss of generality, that a single neighbor discovery process is implemented for all radios in an AP.

First, a brief description of the process 500 is given. Details for each step are provided later. At 510, a list of active radios in the wireless network is obtained, and a radio list database is created. At 520, an initial radio neighboring relationship score is computed and added to the radio list database. At 530, a list of radio neighbors is determined from the radio list database. This list of radio neighbors, along with other information about those neighbors, is provided to the RRM modules 505. At 540, the neighbor discovery process 500 then registers (subscribes) to the identified neighbor radios in the list. At 550, those neighbor radios then send (publish) information and measurements to the neighbor discovery process 500 about the neighbor radio itself and client devices or other radios detected by the neighbor radio. Information and measurements about the set of local radios controlled by the neighbor discovery process 500 and detected client devices and radios by the set of local radios are also collected. The collected information and measurements are then used to update the radio list database of the neighbor discovery process. Following the data collection and radio list database, at 560, a new neighboring score is determined for the radios in the radio neighbor list. The neighbor discovery process then proceeds by updating again, at 530, the radio neighbor list based on the updated radio list database and the process 500 indefinitely continues.

The radio list, denoted U, contains the list of all known active radio, e.g., 220-(j,i), in a wireless network, e.g., 100. The radio list U can be obtained in different ways by the neighbor discovery process 500. In the presence of a wireless network controller, e.g., 180, the neighbor discovery process 500 can contact the controller 180 to obtain the list of known radios in the wireless network 100. In another approach, the neighbor discovery process 500 can send discovery broadcast messages in the distribution communication network, e.g., 160. One or more radios in the AP can also establish the radio list using wireless signals received from other radios. The active radio list is established initially and can be updated periodically thereafter at fixed, random or event triggered intervals.

The obtained radio list can also contain, for radio ranking purposes, additional information $A_{i,j}$ to complement the data that will be collected by the neighbor discovery process. For example, information about a radio location, radio coverage, received signal strength, or historical information about previous ranking and radio scoring, can be included with the obtained radio list.

Figure 6:
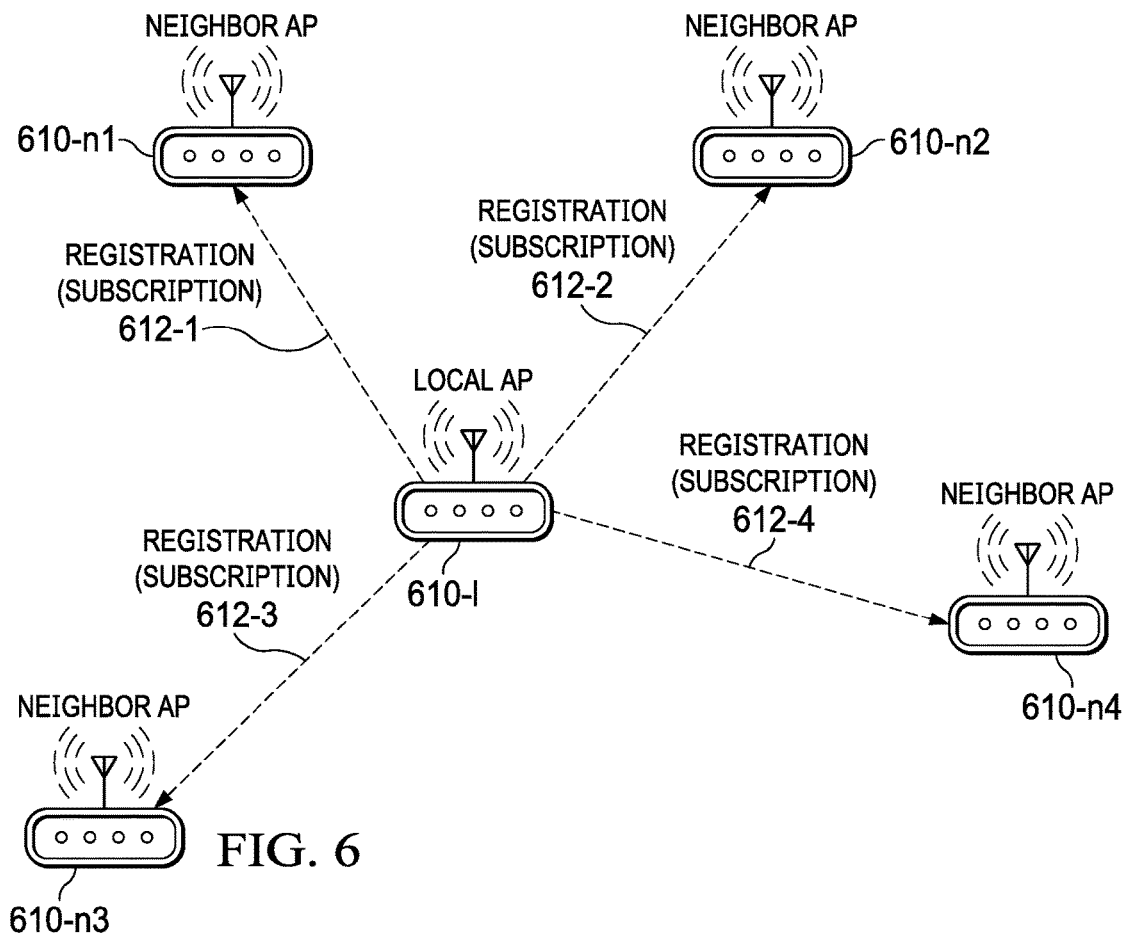
FIGS. 6-7 show aspects of neighbor discovery process.

With reference to FIG. 6, let denote by $N_1$ the set of neighbor AP's 610-*n*1, ..., 610-*n*4 where a neighbor AP includes at least one neighbor radio determined by the neighbor discovery process 500 running on local AP 610-1 (assuming for clarity a single neighbor discovery process per AP 610-1) at a given iteration of the neighbor discovery process. The neighbor discovery process on the local AP 610-1 then sends a registration (subscription) message 612-1, ..., 612-4 to the set of neighbor APs 610-*n*1, ..., 610-*n*4.

Figure 7:
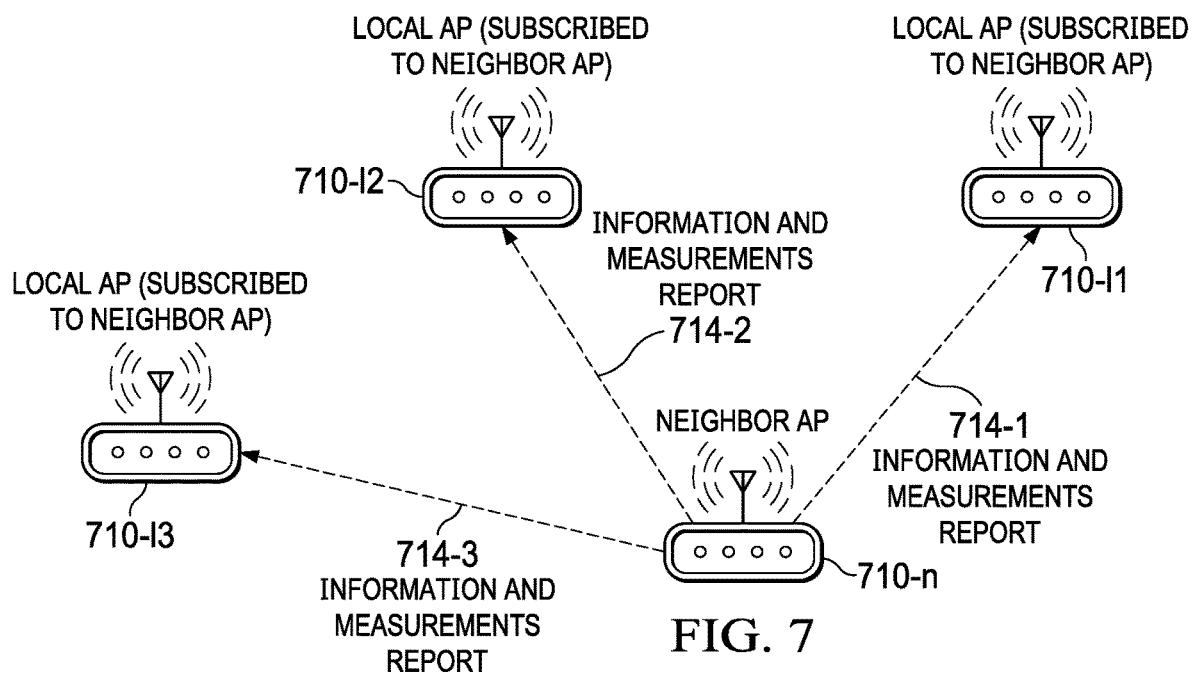

Each AP in the wireless network, e.g., 100, can receive registration messages from several neighbor discovery processes running on the same or different local APs. As shown in FIG. 7, each neighbor AP 710-*n* in the wireless network sends reporting messages 714-1, 714-2, 714-3 to the neighbor discovery processes on a local AP 710-11, 710-12, 710-13 that previously registered (subscribed) to the neighbor AP 710-*n*. Reporting messages 714 from the neighbor AP 710-*n* can be sent at different times such as, but not limited to, at fixed intervals following the registration message reception, at fixed intervals according to the neighbor AP 710-*n* clock, at random intervals, or when events occur at the neighbor AP 710-*n* (for example, a new measurement is available). The neighbor AP 710-*n* will send reporting messages 714 to a neighbor discovery process for a fixed period of time following the registration message reception from this neighbor discovery process or until a message is received from the neighbor discovery process indicating that the neighbor radio in AP 710-*n* is no longer registered with the neighbor discovery process in AP 710-1.

A neighbor AP 710-*n* sends reporting messages, e.g., 714, to a neighbor discovery process on local AP 710-*n* that subscribed to a radio, e.g., 220-(*j,n*), concerning the neighbor radio j indicated in a subscription message, e.g., 612, or some or all radios j=1, ..., $J_n$ in the neighbor AP 710-*n*. For each neighbor radio, e.g., 220-(*j,n*), the reporting messages, e.g., 714, include information and measurements $R_{n,j}$ about the radio including at least one of the following, but not limited to: radio capabilities and parameters (protocols, services and networks, number of spatial streams, frequency band, channel, transmit power, etc.), number of connected clients statistics, receive and transmit physical rate statistics, receive and transmit RSS statistics, error rates, channel utilization, RSS of signals received from other radios (including channel and time of detection), throughput statistics, transferred data statistics, etc. $R_{n,j}$ may also include the time at which the information and measurements were collected. For each neighbor radio, e.g., 220-(*j,n*), the reporting messages, e.g., 714, may also include information and measurements $C_{n,j,k}$ about wireless clients k=1, ..., $K_{n,j}$, for which, as shown in FIG. 7, management or data messages have been received by the radio including at least one of the following, but not limited to: client receive and transmit physical rate statistics, client receive and transmit RSS statistics, received reports (e.g., 802.11k) from this client about other radios in the wireless network, client throughput statistics, client transferred data statistics, events such association and disassociation, client capabilities and parameters, etc. $C_{n,j,k}$ may also includes the time at which the information and measurements were collected and the client identifier (for example the client MAC address).

Figure 8:
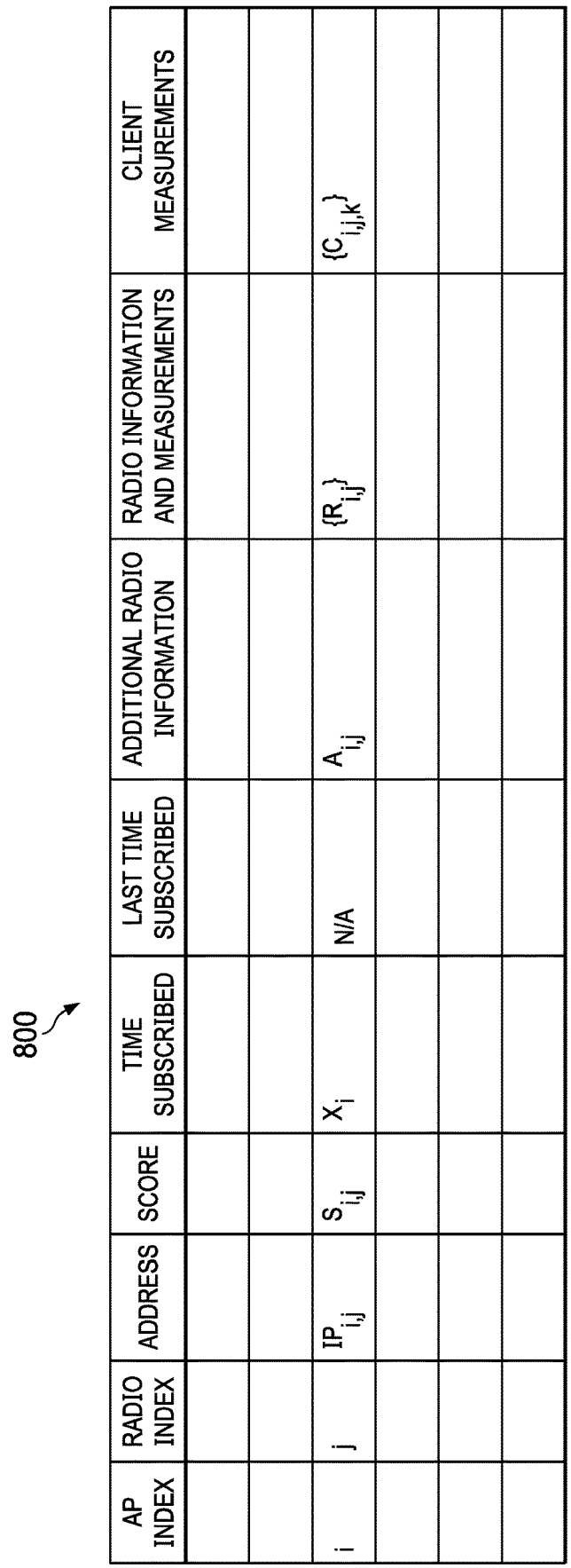
FIG. 8 shows an example of a radio database in accordance with the disclosed technologies.

FIG. 8 shows that each neighbor discovery process maintains a radio database 800 containing the list of radios in the radio list U. For each radio (j,i) in the radio list, various information are stored in the radio database. For example, and without limitations, the following information can be stored in the radio database 800:

The AP index i

The radio index j in AP;

The $AP_i$ communication interface address in the distribution communication network (e.g., MAC address or IP address)

The radio (j,i) neighboring score $S_{i,j}$ (more details will be given later on the score)

A time stamp $X_i$ equal to, if the radio is in the neighbor radio list, the elapsed time that this radio has been in the neighbor radio list, otherwise, the last time that the radio was in the neighbor radio list The initial information $A_{i,j}$ received for this radio The set of radio information and measurements $\{R_{i,j}\}$ received for radio (j,i) through the reporting messages. For each $R_{i,j}$, the time at which the reporting messages was received or collected is also stored The set of client information and measurements $\{C_{i,j,k}\}$ received for clients for radio (j,i) through the reporting messages. For each $C_{i,j,k}$, the time at which the reporting messages was received or collected is also stored.

For a neighbor discovery process running on local $AP_1$ (assuming for clarity a single neighbor discovery process per AP, e.g., 610-1), in addition to information received from neighbor radios, the initial information $\{A_{1,j}\}$, and radio information and measurements $\{R_{1,j}\}$ and client information and measurements $\{C_{1,j,k}\}$, for all local radios j=1, ..., $J_1$ are also collected. Radio information and measurements $R_{i,j}$ and client information and measurements $C_{i,j,k}$ can be deleted from the radio database when a certain amount of time has elapsed since they were collected or received.

At fixed time intervals, random time intervals or event occurrence (for example, the reception of a new report message), the neighbor discovery process on the local AP, e.g., 610-1, determines a radio neighboring score for one, some or all radios in the radio list database. For a neighbor radio, e.g., 220-(*j,i*), where (i≠1), the radio neighboring score $S_{i,j}$ is an indication of the neighboring relationship between this neighbor radio and the set of (local) radios associated with the neighbor discovery process. Typically, $S_{i,j}$ is a monotonously increasing or decreasing function of the neighboring relationship. For clarity, but without loss of generality, we will assume that $S_{i,j}$ is a monotonously increasing function, such that a higher value of $S_{i,j}$ indicates a stronger neighboring relationship. The score $S_{i,j}$ is computed as follows:

$$S_{i,j}=f(A_{i,j},\{R_{i,j}\},\{C_{i,j,k}\},A_{1,1},\ldots,A_{1,J_1},\{R_{1,1}\},\ldots,\{R_{1,J_1}\},\{C_{1,j,k}\},\ldots,\{C_{1,J_1,k}\}) \quad (1),$$

where f( ) is an arbitrary function which at least depends on one client information and one measurement from the local AP, e.g., 610-1, and one client information and one measurement from the neighbor radio, 220-(*j,i*). Note that EQ. (1) used for computing the radio neighboring score $S_{i,j}$ can be modified to include one, some or all radios from the neighbor $AP_i$ and/or the local $AP_1$.

Figure 9:
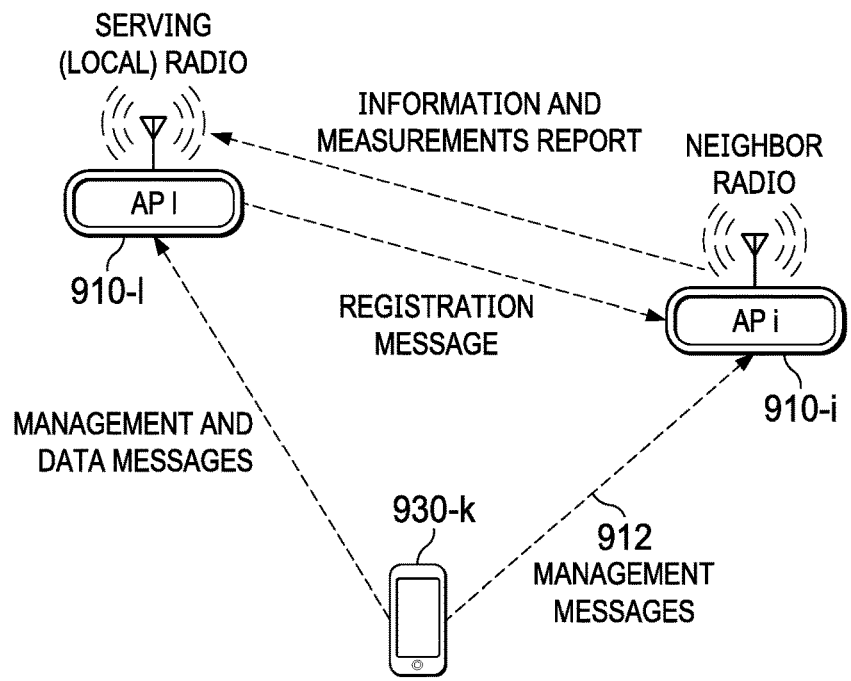
FIG. 9 shows other aspects of neighbor discovery process.

FIG. 9 illustrates the importance of considering client information and measurements to score the neighboring relationship. Assume that the neighbor discovery process is running on local AP 910-1 and registered to a neighbor radio 220-*j* belonging to neighbor AP 910-*i*. Let also assume that a client 930-*k* is associated with a serving radio 220-*j'* in local AP 910-1. Then AP 910-1 will collect measurements $\{C_{1,j',k}\}$ regarding this client 930-*k*. Furthermore, if this client 930-*k* is also in the coverage area of the neighbor radio 220-*j* of AP 910-*i*, then radio 220-(*j,i*) will likely receive (hear) management messages 912 (e.g., probe requests) from this client 930-*k* and can thus collect measurements about this client 930-*k*. Those client and information measurements $\{C_{i,j,k}\}$ will be reported to the neighbor discovery process on AP 910-1 by the information and measurement reports 714. If those measurements indicate, for example, a strong signal for both the neighbor radios 220-(*j,i*) and the local radio 220-(*j'*,1), then the neighbor discovery process can infer that there is a strong neighboring relationship between those two radios. It should be clear that sharing client measurements between APs and radios in the wireless network 100 can resolve the various issues related to misidentification of neighbors in the wireless networks discussed before.

Figure 10:
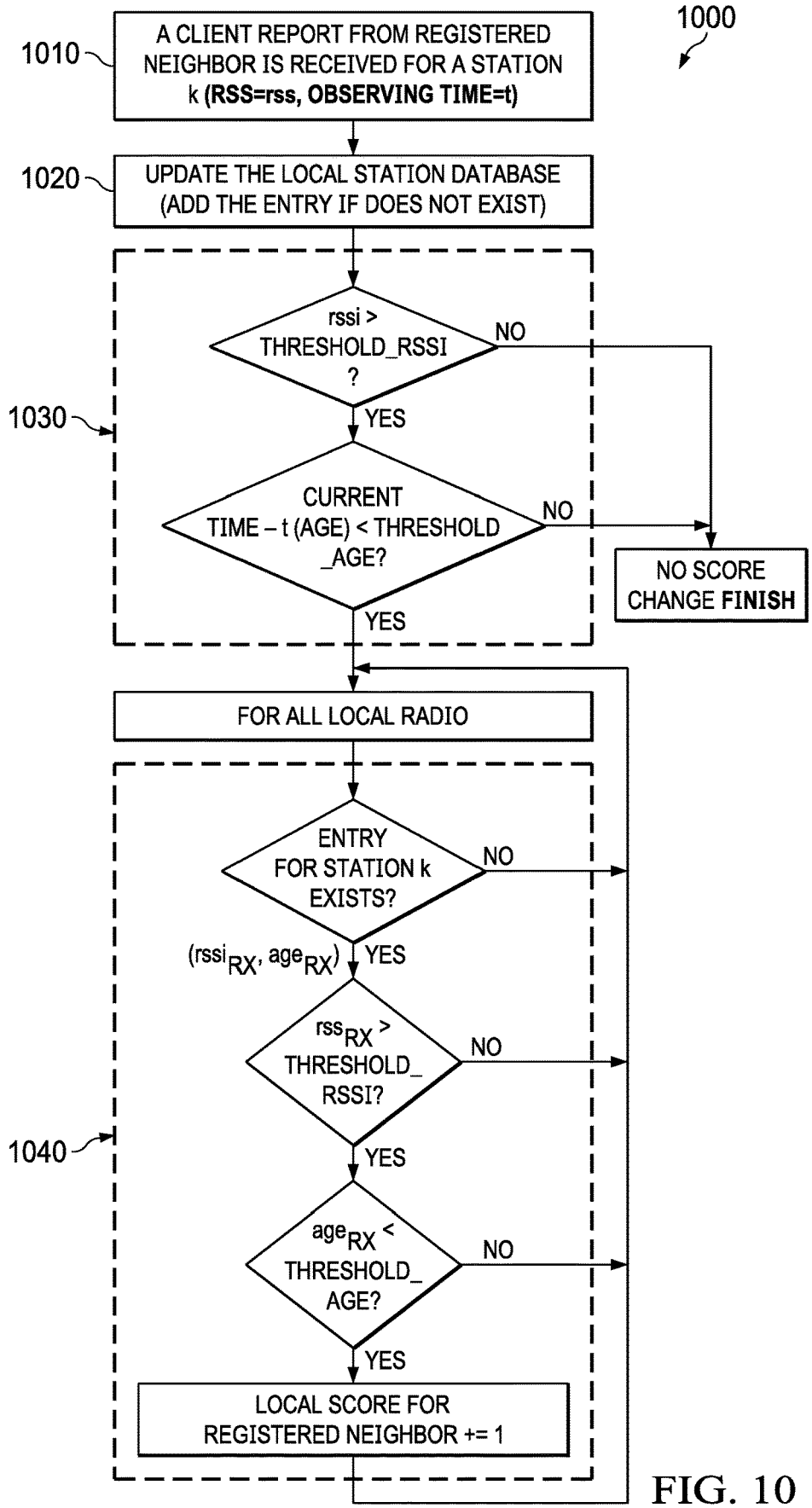
FIG. 10 shows an event triggered algorithm in accordance with the disclosed technologies.

FIG. 10 shows an event triggered algorithm 1000 to implement the radio neighboring score update function f( ) for $S_{i,j}$, in accordance with EQ. (1), using only the received signal strength measurements for clients. The algorithm 1000 is triggered, at 1010, every time a report message is received by the neighbor discovery process. At 1030, if the RSS reported by the neighbor radio (j,i) is stronger than a threshold and is not older than a given age, then, at 1040, the radio neighboring score $S_{i,j}$, for all radios j' in AP l, is increments by one, if the measured RSS by this radio (j',l) is stronger than a threshold and is not older than a given age. In other words, the score is incremented if both the local radio (j',l) and the neighbor radio (j,i) have seen this client recently with a signal higher than a given threshold RSSI. Several other functions are possible.

For the initialization case the radio neighboring score can only be computed using the initial information. That is $$S_{i,j}=h(A_{i,j},A_{l,1},\ldots,A_{l,J_l}) \quad (2),$$

where h( ) is an arbitrary function. For example, referring to EQ. (2), the radio neighboring score can be a function of the distance between AP's, the coverage areas, or the last known score if there is historical data. In the case that no initial information is available, the radio neighboring score can be an identically and independently distributed number for all radios in the list.

At 530, the initial 520 or updated 560 radio neighboring scores in the radio database 800 are used by the neighbor discovery process to determine the radio neighbor list. This update of the radio neighbor list can be done at periodic time intervals, random time intervals or be event triggered.

Let assume that the radio database contains X radios. For large networks, X can exceed thousand of radios. If all neighbor discovery processes select all radios as neighbors, this will generate an exponentially large amount of traffic in the distributed communications network 160 and a high computation load in the APs. Furthermore, all radios in the wireless networks are not neighbors. For example, a radio might have approximately 3 to 10 neighbors that have overlapping or nearby coverage and that are useful for the RRM modules 505. The radio neighbor list should thus have Y radio entries, where Y is much smaller than X. Meanwhile, the neighbor discovery process doesn't initially know the neighbors. Also, the network might not be static, e.g., radio coverage is adjusted or APs are moved, or new APs are added to the wireless network, and the radio neighbors can thus vary over time. It is therefore important to regularly evaluate, e.g., obtain information and measurements to update the radio neighboring score, for all APs in the wireless network. That is the radio neighbor list shall not be static. Consequently, the process to determine the radio neighbor list must meet the following two criteria: 1) Contain the most likely radio neighbors; and 2) Contain entries that are periodically updated.

Figure 11:
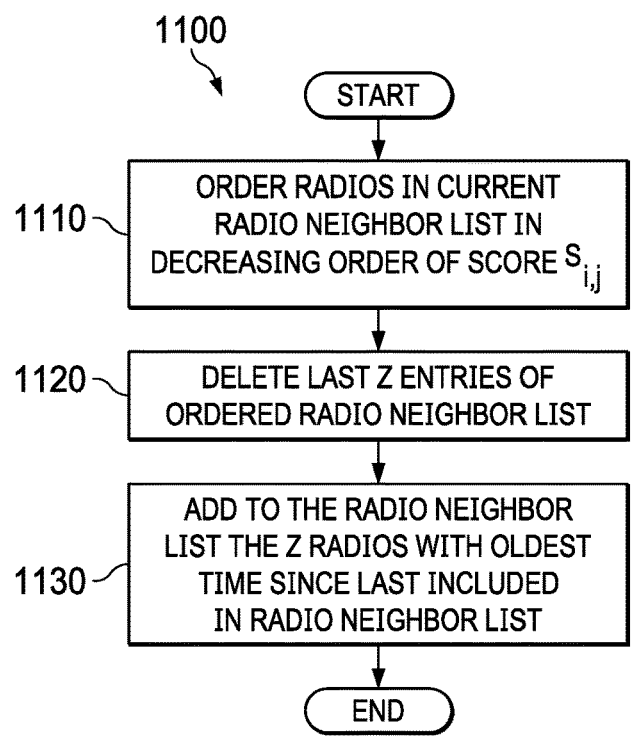
FIG. 11 shows an algorithm for determining a radio neighbor list at periodic time intervals.

FIG. 11 shows an algorithm 1100 to determine a radio neighbor list with Y entries at periodic intervals. At 1110, the radios in the radio neighbor list are ranked in decreasing order of radio neighboring score $S_{i,j}$. At 1120, the last 0<Z<Y entries of the ordered radio neighbor list are removed from the list. Steps 1110, 1120 ensure that the most likely neighbors (i.e., the ones with the largest score) are kept in the radio neighbor list and that new entries will be added to the list for new neighbor scoring evaluation. At 1130, the Z radios that have not been included in the radio neighbor list for the longest time are added to the radio neighbor list. That is, the Z radios with the lowest radio neighboring score after a given period of time are replaced in the list with new radios that have not been evaluated for a long period of time. Therefore, steps 1120, 1130 ensure that the radio neighbor list entries are periodically changed and all radios in the wireless network will eventually be evaluated. After a certain period of time, the first Y-Z entries of the radio neighbor list will converge to the most appropriate radio neighbors. Several other algorithms that meet the criteria given in the previous paragraph are possible for determining the radio neighbor list from the radio database.

Note that the algorithm 1100 does not work to determine the initial radio neighbor list. In this case, the initial radio neighbor list can simply contain the Y radios with the largest radio neighboring score $S_{i,j}$ as determined in the initial radio neighbor scoring or can contain Y randomly selected radios.

Note that in the case that there is a single radio neighbor discovery process in an AP, the other local radios in the AP can be considered default radio neighbor for a given radio for the purpose of the RRM modules 505. In this case, they should not be included in the radio neighbor list for registration purposes. If multiple radio neighbor discovery processes are instantiated in the AP, then the process described previously can be applied for each radio neighbor discovery process except that the radio neighboring scoring function should be modified to only take into account the radio neighbor discovery process of local radios.

The radio neighbor list computed by the radio neighbor discovery process 500, along with the radio database 800, can be used to improve the performance of various radio resource management modules. A first use case is to use the radio neighbor list to facilitate anomaly detection, which entails detecting instances when a radio is not behaving as expected. A first approach is to use detection rules or statistical analysis and machine learning to detect when the radio statistics are not behaving as expected and declare a radio anomaly. This process can be improved by analyzing, cross-referencing and comparing the radio statistics with other radios in the wireless network. However, a wireless network encompasses multiple radios that don't operate in the same environment and traffic conditions. For example, a wireless network can include a radio in an office and a radio in a public area which will have different statistics and can't be used as cross-references for anomaly detection. The proposed approach is to use the radio neighbor list to infer radios which operate in similar conditions and should be used as reference for anomaly detection. For example, two radios that have significantly overlapping coverage or adjacent coverage and similar operating parameters should have similar statistics. If that is not the case, then a radio can be declared as behaving anomalously.

Figure 12:
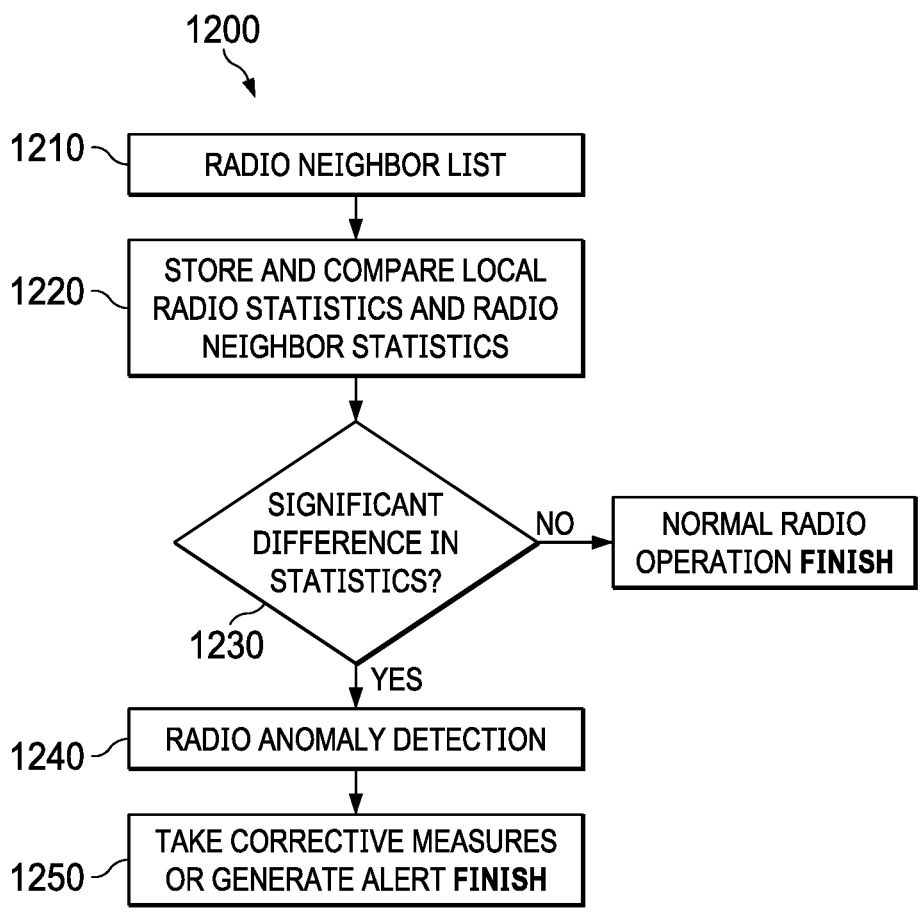
FIG. 12 shows an algorithm that uses a radio neighbor list for anomaly detection.

FIG. 12 shows an algorithm 1200 that uses a radio neighbor list to perform anomaly detection. This algorithm can be implemented either in the processor bank (e.g., 240) of an AP (e.g., 210) or in an external component such as the wireless network controller (e.g., 180). At 1210, a radio neighbor list is determined and provided to the anomaly detection algorithm. For example, the radio neighbor discovery process 500 can be used to determine the radio neighbor list. If the anomaly detection is running in a component different from the AP integrating the local radio (or radios), then the radio neighbor list is transmitted via the distribution communication network (e.g., 160) to the component implementing the anomaly detection algorithm.

At 1220, radio and client information and measurements for the local (or reference radio) and the radio neighbors of this local radio contained in the radio neighbor list are stored. The local radio and neighbor radio statistics can be obtained from the radio database or by messages sent from the radios to, for example, the wireless network controller. Also at 1220, the stored statistics of the local radio and its neighbor radios are compared. At 1230, a determination is made whether a significant difference exists. If so, then at 1240, an anomaly is detected for the local radio. This can be accomplished, at 1230, by using pre-determined rules, e.g., if a radio statistic shows more than one to three standard deviations from the neighbor radio statistics, then the radio can be declared as anomalous. Another approach is to use supervised or unsupervised machine learning algorithms to automatically learn the self-comparison, e.g., comparing the local radio statistics with its own historical statistics, and cross-reference comparison, e.g., comparing the local radio statistics with its neighbor instantaneous and historical statistics, rules to declare an anomaly. If an anomaly is declared at 1240, then, at 1250, a RRM algorithm can be used to automatically take corrective measures, such as adjusting the power, the channel or the CLB parameters, and/or to generate an alert to the wireless network manager.

Another use case, is to use the radio and client information and measurements collected in the radio database to assign channels to the radios. The stronger the neighboring relationship, as determined by the collected information and measurements, the higher the cost of assigning the same channel or adjacent channels to the radios should be.

Figure 13:
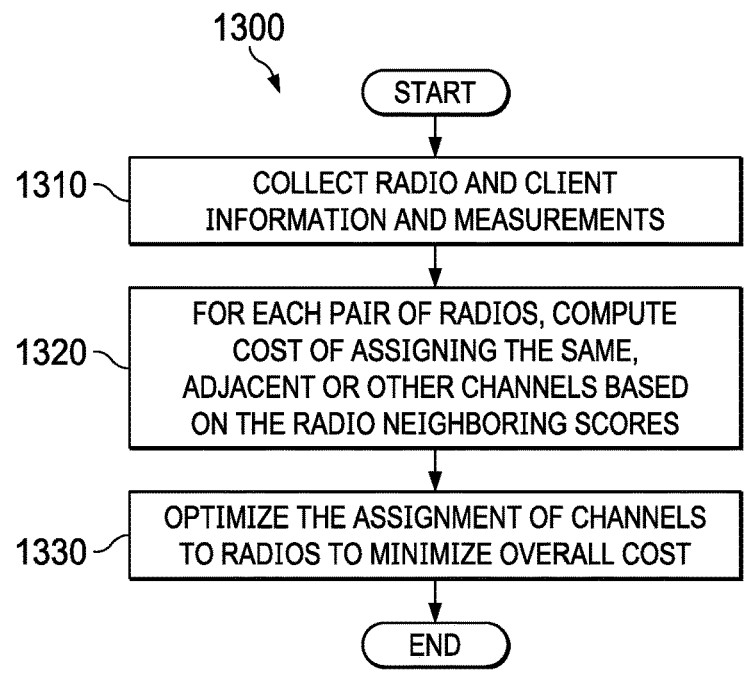
FIG. 13 shows an algorithm that uses collected radio and client parameters and measurements to perform channel assignment.

FIG. 13 shows an algorithm 1300 that uses the collected radio and client parameters and measurements to perform channel assignment. At 1310, radio and client parameters and measurements are collected, e.g., by using the radio neighbor discovery process 500. The algorithm could be implemented locally in each AP (e.g., 210), or in a centralized entity, such as the wireless network controller (e.g., 180). In the latter case, radio and client information and measurements are transmitted by the APs to the centralized entity (e.g., 180) via the wireless distribution network (e.g., 160). At 1320, for each pair of radios, a cost of assigning the same channel, adjacent channel or another channel is computed using some function of the radio and client information and measurements. At 1330, a channel assignment to a single radio, in the case of a distributed algorithm, or of all radios for a centralized algorithm is determined with the objective of minimizing the overall cost of the channels assignment considering the radio constraints (for example, radios can be limited to a certain range of channels). To help accelerate the optimization at 1330, heuristic optimization algorithms can be employed that only locally optimize the channel assignment for a radio considering the neighbors indicated in the radio neighbor list.

As a way of example, the cost $C_{m,n}$ between two radios 220-$m$ and 220-$n$ on different APs can be computed based on a distance $d_{m,n}$ between the APs including each radio 220-$m$ and 220-$n$, as follows:

$$C_{m,n,co-channel} = \frac{\alpha_{co-channel}}{d_{m,n}^2}, \quad (3)$$

$$C_{m,n,adj-channel} = \frac{\alpha_{adj-channel}}{d_{m,n}^2}, \quad (4)$$

$$C_{m,n,other-channel} = \frac{\alpha_{other-channel}}{d_{m,n}^2}, \quad (5)$$

EQ. (3) provides the cost of assigning the same channel, EQ. (4) provides the cost of assigning the adjacent channel, and EQ. (5) provides the cost of not assigning the same, or the adjacent, channel. In EQs. (3)-(5), the distance $d_{m,n}$ between APs can be computed, for example, from the initial radio list information $A_{i,j}$. The parameters $\alpha_{co-channel}$, $\alpha_{adj-channel}$ and $\alpha_{other-channel}$ satisfy the following conditions $\alpha_{co-channel} > 2\alpha_{adj-channel}$ and $\alpha_{adj-channel} > 2\alpha_{oth-channel}$, for instance.

As another example, the cost $C_{m,n}$ between two radios 220-$m$ and 220-$n$ can be computed based on a radio neighboring score $S_{m,n}$ between radios, as follows:

$$C_{m,n,co-channel} = \frac{\alpha_{co-channel}^1}{1 + e^{-\alpha_{co-channel}^2(S_{m,n} - \gamma_{co-channel})}}, \quad (6)$$

$$C_{m,n,adj-channel} = \frac{\alpha_{adj-channel}^1}{1 + e^{-\alpha_{adj-channel}^2(S_{m,n} - \gamma_{adj-channel})}}, \quad (7)$$

$$C_{m,n,co-channel} = \frac{\alpha_{other-channel}^1}{1 + e^{-\alpha_{other-channel}^2(S_{m,n} - \gamma_{other-channel})}}. \quad (8)$$

EQ. (6) provides the cost of assigning the same channel, EQ. (7) provides the cost of assigning the adjacent channel, and EQ. (8) provides the cost of not assigning the same, or the adjacent, channel. In EQs. (6)-(8), the radio neighboring score $S_{m,n}$ is a monotonously increasing function of the neighboring relationship between radios such as, but not limited to, the one computed using the algorithm 1000 or some other function f( ) in EQ. (1). The parameters $\alpha_{co-channel}^1$, $\alpha_{adj-channel}^1$ and $\alpha_{other-channel}^1$ satisfy the following conditions $\alpha_{co-channel}^1 > 2\alpha_{adj-channel}^1$ and $\alpha_{adj-channel}^1 > 2\alpha_{other-channel}^1$. Further in EQs. (6)-(8), $\alpha_{co-channel}^2$, $\alpha_{adj-channel}^2$, $\alpha_{aother-channel}^2$, $\gamma_{co-channel}$, $\gamma_{adj-channel}$ and $\gamma_{other-channel}$ are tuning parameters.

Other cost functions based on the radio and client information and measurements can be used, where those functions are monotonously increasing with the neighboring relationship between radios, and is larger for co-channel assignment than for adjacent channel assignment, and is larger for adjacent channel assignment than for assignment of a channel that is not the same or adjacent.

Another use case of the radio neighbor list is to facilitate client load balancing between radios. The radio neighbor list is useful in that case for either or both of the following tasks: 1) determining possible target radios for a wireless client device; and 2) determining if wireless clients associated with a local radio should be moved to a different radio and optionally, in the latter case, the number of clients that should be moved to different radios.

Figure 14:
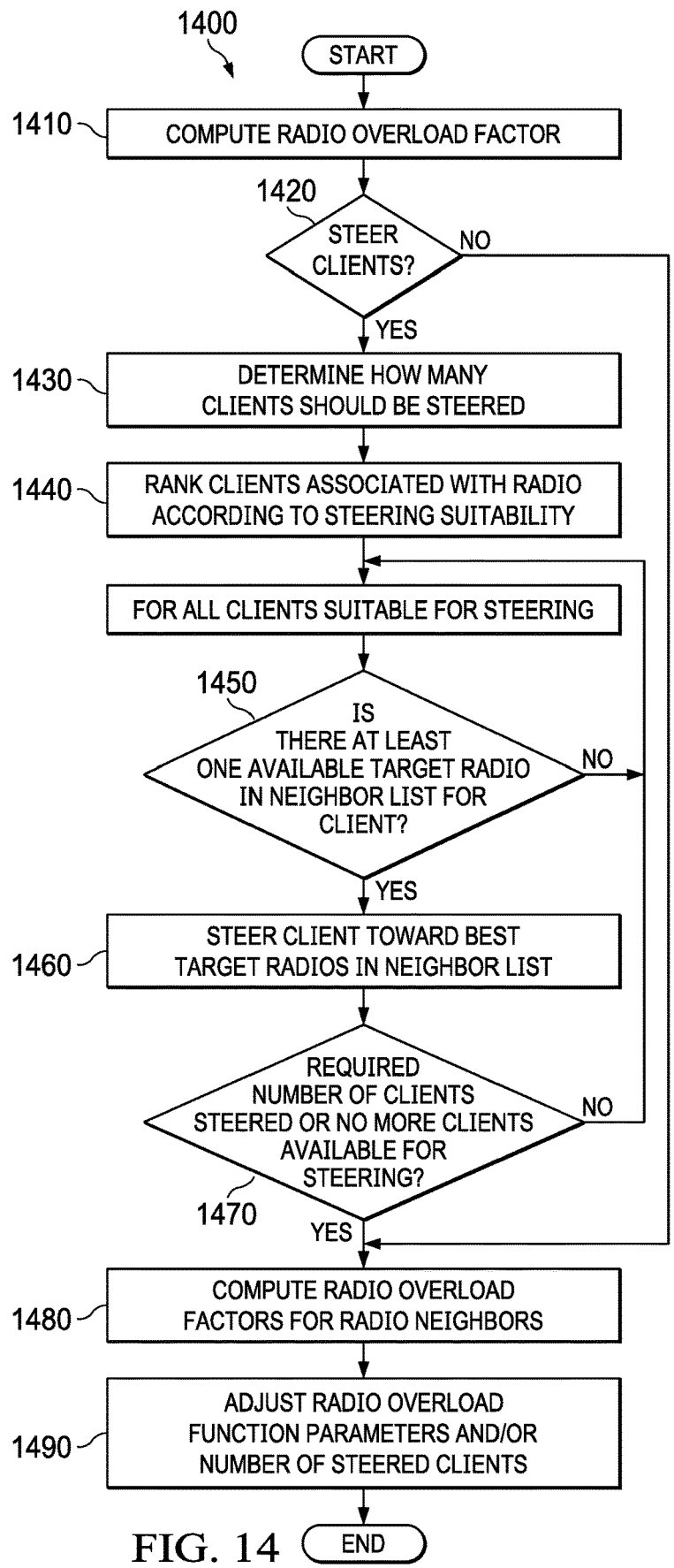
FIG. 14 shows an algorithm for performing client load balancing that leverages a radio neighbor list to improve performance.

FIG. 14 shows an algorithm 1400 to perform client load balancing that leverages a radio neighbor list to improve performance. The algorithm 1400 is implemented independently for different radios inside an AP and for different APs.

At 1410, an overload factor is computed for a local radio associated with the CLB algorithm. This overload factor indicates, at 1420, whether the local radio should attempt to steer wireless clients associated with the local radio to different target radios. At 1420, the overload factor can also be used to infer the number of clients that the local radio should attempt to steer to different target radios.

The overload factor $\gamma_{i,j}$ for a radio 220-$j$ on AP 210-$i$ is some arbitrary function g( ) of the radio 220-$(j,i)$ information and measurements $\{R_{i,j}\}$:

$$\gamma_{i,j} = g(\{R_{i,j}\}) \quad (9).$$

As a way of example, and without limitations, let define the step function $$U(x, y) = \begin{cases} 1 & \text{if } x > y \\ 0 & \text{otherwise} \end{cases}. \quad (10)$$

Moreover, let $n_{i,j}$ be the number of users connected to radio 220-(j,i), $N_{i,j}$ be the threshold number of users connected to radio 220-(j,i), $u_{i,j}$ be the channel utilization measured by radio 220-(j,i), and $U_{i,j}$ be the threshold channel utilization for radio 220-(j,i). Then, the overload factor for radio 220-(j,i) can be computed using EQs. (9)-(10), as follows:

$$\gamma_{i,j} = U(n_{i,j}, N_{i,j}) U(u_{i,j}, U_{i,j}) \quad (11).$$

That is, if the number of connected users and the radio channel utilization both exceed their respective thresholds, the overload factor for radio 220-(j,i) is 1, otherwise it is 0. In this case, at 1420Y, an overload factor of 1 indicates that the radio should attempt to steer a pre-determined number of clients, otherwise, at 1420N, no clients need to be steered.

As a way of another example, and without limitations, let define the logistic function $$\delta_{\beta_1, \beta_2}(x, y) = \frac{\beta_1}{1 + e^{-\beta_2(x-y)}}. \quad (12)$$

The overload factor for radio 220-(j,i) can then be computed, based on the logistic function of EQ. (12), as follows:

$$\gamma_{i,j} = \delta_{\beta_1^n, \beta_2^n}(n_{i,j}, N_{i,j}) + \delta_{\beta_1^u, \beta_2^u}(u_{i,j}, U_{i,j}) \quad (13),$$

where $\beta_1^n$, $\beta_2^n$, $\beta_1^u$, $\beta_2^u$ are some tuning parameters. In this case, an overload factor below a certain positive threshold indicates that the radio should not attempt to steer clients, otherwise the radio should attempt to steer clients.

The advantage of computing the overload factor in this manner is that the overload factor provided by EQ. (13) can also be used, at 1430, to infer directly or indirectly the number of wireless clients that should be steered from the local radio toward a target radio. For example, the number of wireless clients that the local radio attempts to steer can be set equal to the smallest integer number larger than the overload factor. As another example, the number of wireless clients that the local radio attempts to steer can be generated according to a random Poisson distribution with a mean given by the overload factor. As another example, the overload factor can be used to compute the probability with which the local radio should attempt to steer each connected client. In the latter example, for each client connected to the local radio, the radio will determine that it should attempt to steer this client if an independently and uniformly generated random number between 0 and 1 is below the overload factor.

Once the radio client load-balancing algorithm has determined, at 1420Y, that it should attempt to steer a certain number of wireless clients, then it can optionally determine that some wireless clients connected to the local radio are not suitable for steering or rank the connected wireless clients in order of steering suitability. At 1440, the steering suitability determination and ranking can be made based on various criteria, such as, but not limited to, the client capabilities, support for transition management, connection activity, RSSI levels, physical transmission rates, etc. If not ranking is done, then clients can be randomly sorted.

For each connected wireless client suitable for steering in the ranked list, the CLB algorithm will determine, at 1450, if at least one radio in the local radio neighbor list is a suitable target radio to steer this wireless client. A neighbor radio is a suitable target radio for a given wireless client if, for example, it is not overloaded according to its overload factor, it offers the required network and radio services for this wireless client, its channel utilization is below a certain threshold, the client RSSI and/or physical transmission rates for this radio is above a certain threshold, etc. To determine if a neighbor radio is suitable to steer a wireless client, radio capabilities and measurements received from this neighbor radio, client measurements reported by the neighbor radio, and reports from the wireless client in response to measurement requests from the current local radio can be used. Multiple radios in the neighbor list can be suitable target radios for a same wireless client, in which case the target radios can be ranked, at 1460, according to their steering suitability for this client.

At 1450Y, once at least one suitable radio for steering is found in the radio neighbor list, at 1460, the client will be steered. A first method to steer the wireless client is to send transition management messages to the client containing at least one target radio as a suggested radio for transition. Another method, is to disconnect the client and refuse a given number of connection request from this client thereafter. In the latter case, after a certain number of denials, the client will request a connection from another radio, which most likely will be a target radio.

At 1470, once the required number of clients has been steered, or there is no additional client that the radio can attempt to steer, the client steering phase is finished. At 1480 and 1490, once the client steering phase is finished or if no clients should be steered, the CLB algorithm can optionally adjust some of the parameters used in the overload factor functions and/or the function used to determine the number of clients to steer and/or the pre-determined number of clients to steer when the radio is overloaded. At 1480, the current overload factors for the local and neighbor radios is obtained. A possible approach is to compute the overload factors for the different radios in the radio neighbor list from the received radio parameters and measurements or to directly obtain through messages exchange the overload factors for the different radios in the radio neighbor list.

At 1490, the overload factor of the CLB local radio can be compared to the overload factors of the neighbor radios to adjust some of the parameters used to compute the overload factor and/or the number of clients to steer when the local radio is in overload. Those adjustments should be made to ensure that neighboring radios have a similar load. Both the current and historical overload factors can be considered.

For example, assume that the overload factor of the radios is computed using the logistic function $\beta_{\beta_1, \beta_2}(x,y)$, based on EQs. (12)-(13). When the local radio has an overload factor that is larger than the neighbor radios (for example, above the mean or median, or in a given percentile, etc.), it indicates that the local radio has a larger load than the neighbor radios and should steer more wireless clients in the next CLB cycle. In this case, the logistical function parameter y could be decreased such that the local radio has a larger overload factor and steers more wireless clients. Inversely, if the overload factor of the local radio is smaller than the overload factor of the neighbor radios, then less wireless clients should be steered and the logistical function parameter y could be increased. Several other control methods based on the radio measurements from the radios in the neighbor list can be used to adjust the overload factor and number of users to steer computations.

Figure 15:
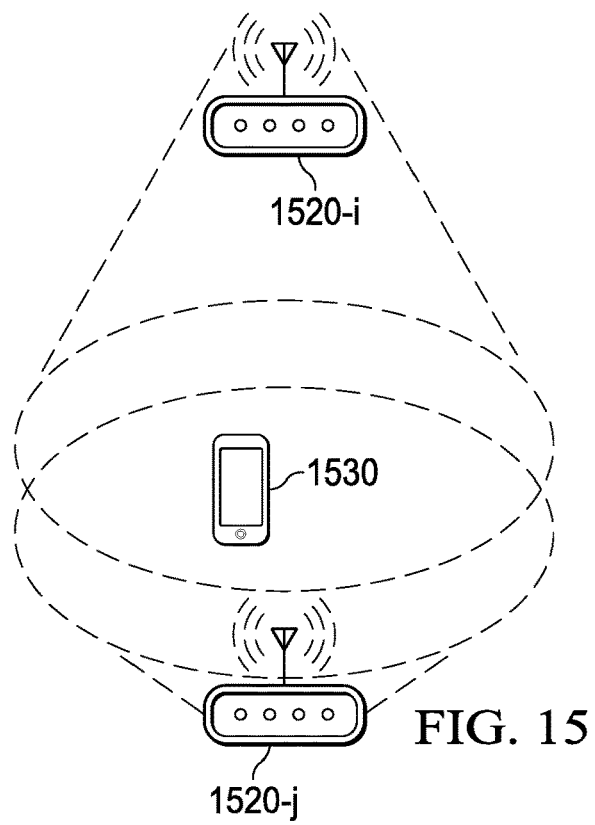
FIG. 15 shows aspects of configuring two radios to use different parameters to compute the overload factor.

In other cases, the parameters to compute the overload factor can be fixed, but different for different radios, including different radios in the same AP. For example, FIG. 15 shows a case where two radios 1520-$i$, 1520-$j$ are configured to have different coverage areas (for clarity the two radios are shown in different APs but the concept also applies for different radios in the same AP). A first radio 1520-$i$ covers an area at a longer distance than the second radio 1520-$j$. The wireless clients 1530 connected to the first radio 1520-$i$ will thus experience lower RSS, and thus lower physical transmission rates, than wireless clients 1530 connected to the second radio 1520-$j$. In consequence, the required average air time to transmit a packet of a given length for wireless clients 1530 connected to the first radio 1520-$i$ is larger than for wireless clients 1530 connected to the second radio 1520-$j$. The first radio 1520-$i$ can thus support a lower number of connected wireless clients 1530 before saturating the air medium than the second radio 1520-$j$. In this case, the parameters to compute the overload factor shall be set different for each radio. For example, the threshold number of users connected to the first radio 1520-$i$ could be set to a lower value than the threshold number of users connected to the second radio 1520-$j$, such that the first radio 1520-$i$ will attempt to steer clients to other radios at a lower load than for the second radio 1520-$j$.

Figure 16:
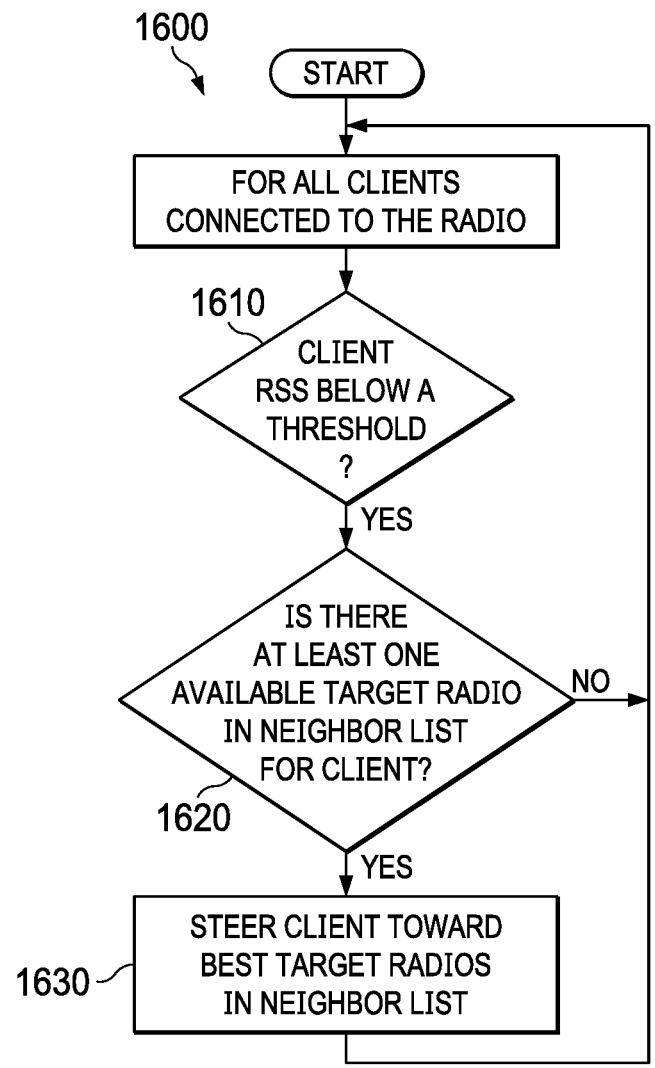
FIG. 16 shows an algorithm that uses a radio neighbor list to facilitate client roaming.

The algorithm 1400 can be modified to perform other radio resource management tasks. For example, and without limitations, FIG. 16 shows an algorithm 1600 which uses the radio neighbor list to facilitate client roaming. At 1610Y, for all wireless clients that are below a certain RSS threshold, which indicates that they are far away from the serving radio, the algorithm tries to identify, at 1620, one or more target radios in the neighbor radio list that are suitable candidates for steering. At 1630, the wireless client is then steered toward those target radios.

Another important use case of the radio neighbor list is to facilitate and to increase the accuracy of wireless positioning and client localization. A central entity responsible for positioning, such as the wireless controller (e.g., 180), may request all radios in the wireless network 100 to track a given client and to report a set of specific features of the signal of the client, such as the uplink signal strength (RSSI), time of arrival (ToA) or angle of arrival (AoA). The central entity responsible for positioning will then analyze the reports based on known techniques, such as fingerprinting, triangulation and trilateration, to estimate the location of the client. In large wireless networks the complexity of this tasks might become too large.

Figure 17:
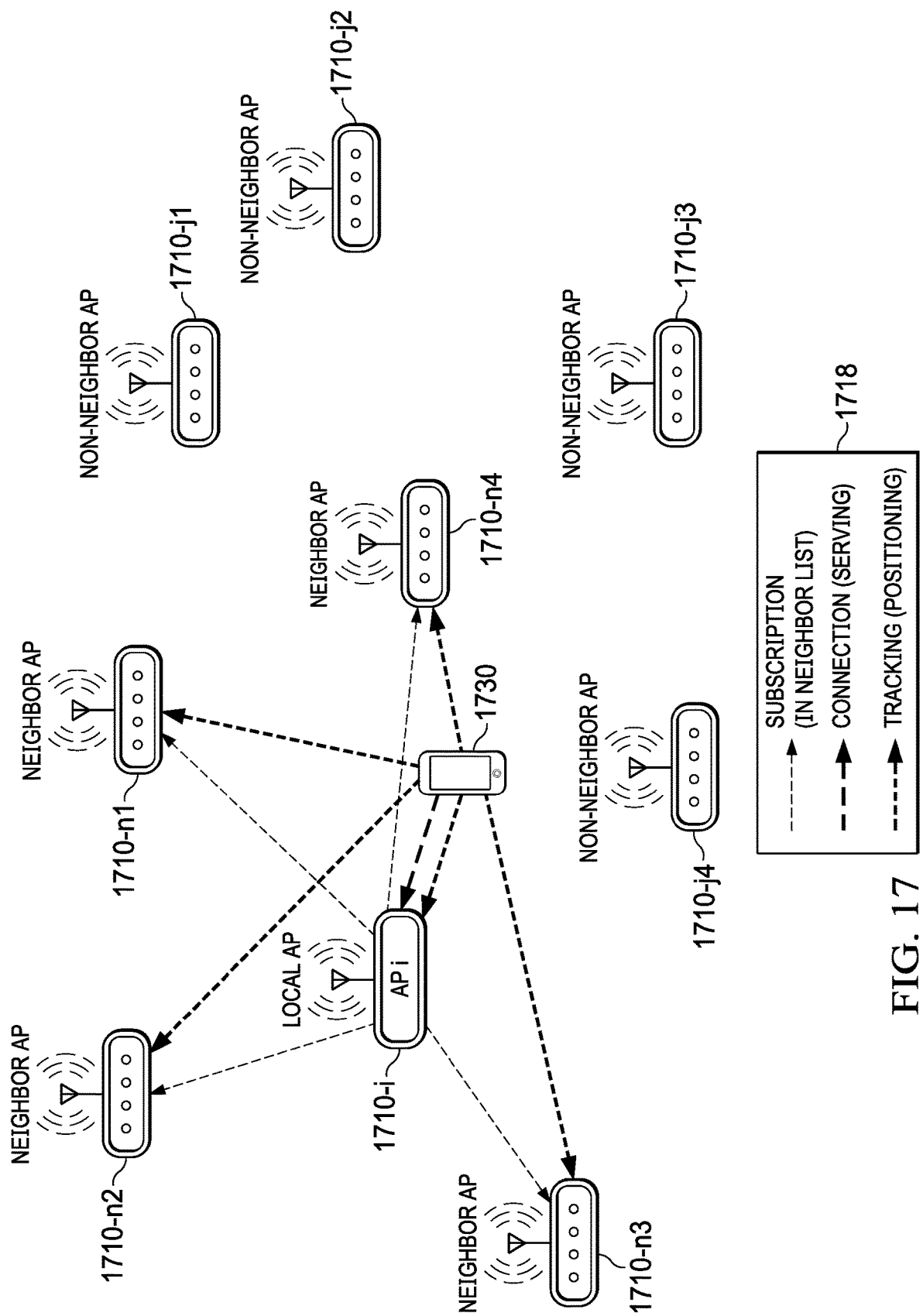
FIG. 17 show aspects of wireless positioning and client localization in accordance with the disclosed technologies.

FIG. 17 shows that leveraging the neighbor list, if a client 1730 is being served by radio 220-($j,i$) of local AP 1710-$i$, only radios of the neighbor APs 1710-$n$1, . . . , 1710-$n$4 of local radio 220-($j,i$) could be required to track, measure and report the station to the central entity (e.g., wireless network controller 180 not shown in FIG. 17) responsible for positioning. In this manner, the exchange of information and the localization complexity can be reduced. As illustrated in the example of FIG. 17, instead of all nine APs 1710-$i$, APs 1710-$n$1, . . . , 1710-$n$4 and APs 1710-$j$1, . . . , 1710-$j$4 having to participate to the positioning of a wireless client, only the AP 1710-$i$ which includes the serving radio and four neighbor APs 1710-$n$1, . . . , 1710-$n$4 will participate. This decreases the complexity since many fewer messages 1718 will be exchanged, the complexity is reduced since there is less data to process, and it increases the accuracy because an optimal subset of radios of the Local AP 1710-$i$ and the neighbor APs 1710-$n$1, . . . , 1710-$n$4 is selected for this purpose and noisy measurements are naturally rejected by the neighbor radio list.

Figure 18:
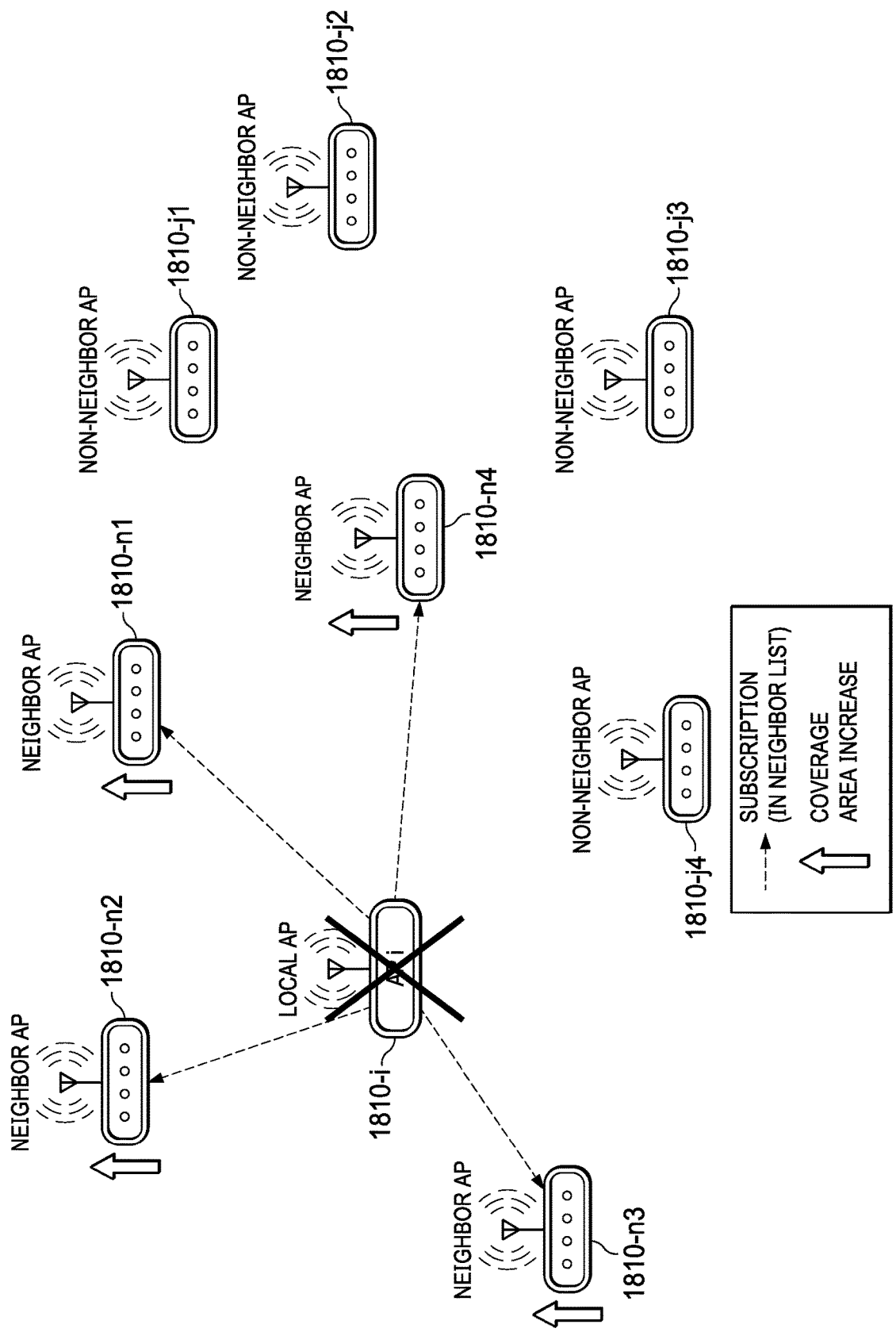
FIGS. 18 and 19A-19B show aspects of self-recovery in a self-managed network in accordance with the disclosed technologies.
Figure 19A:
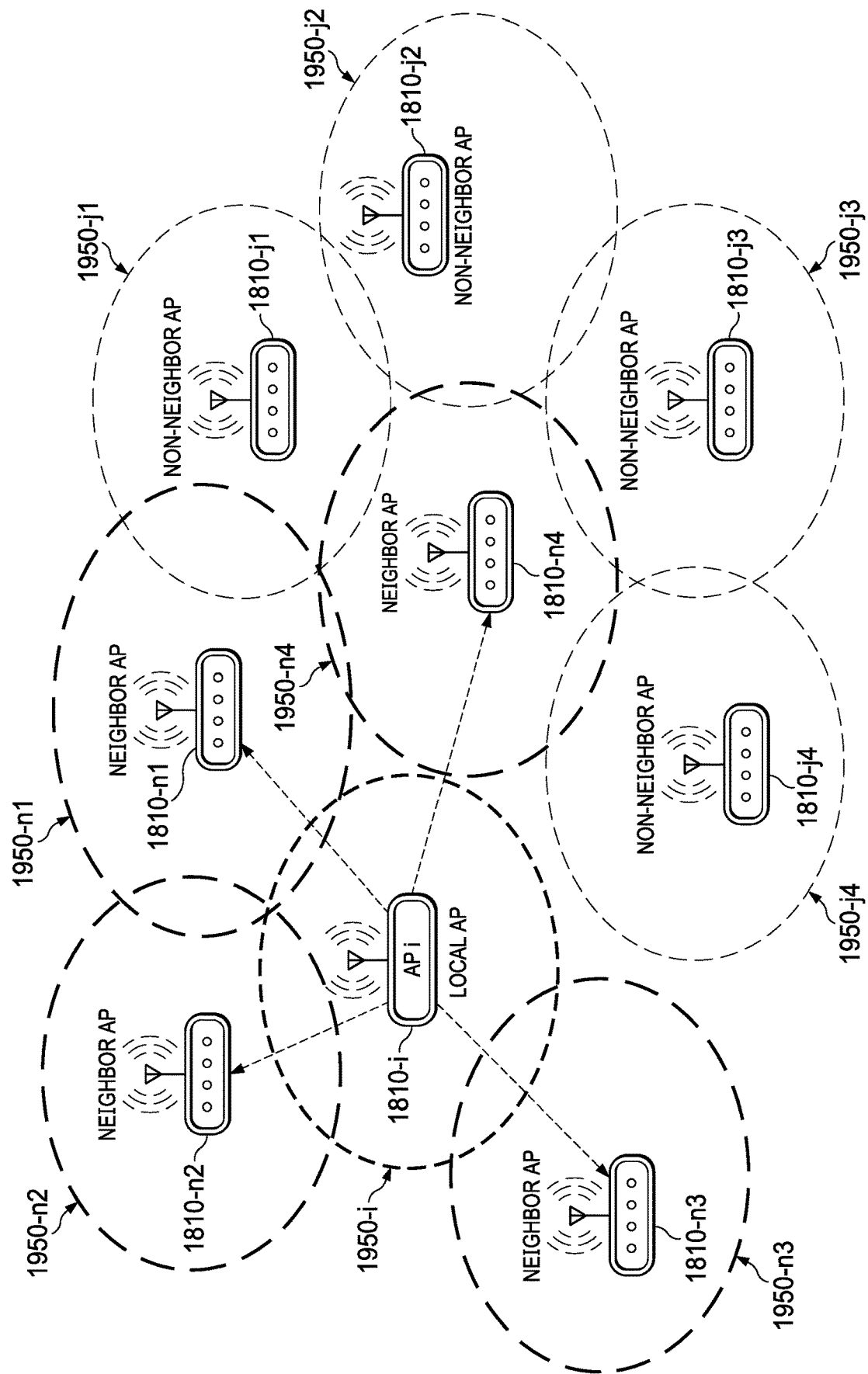
Figure 19B:
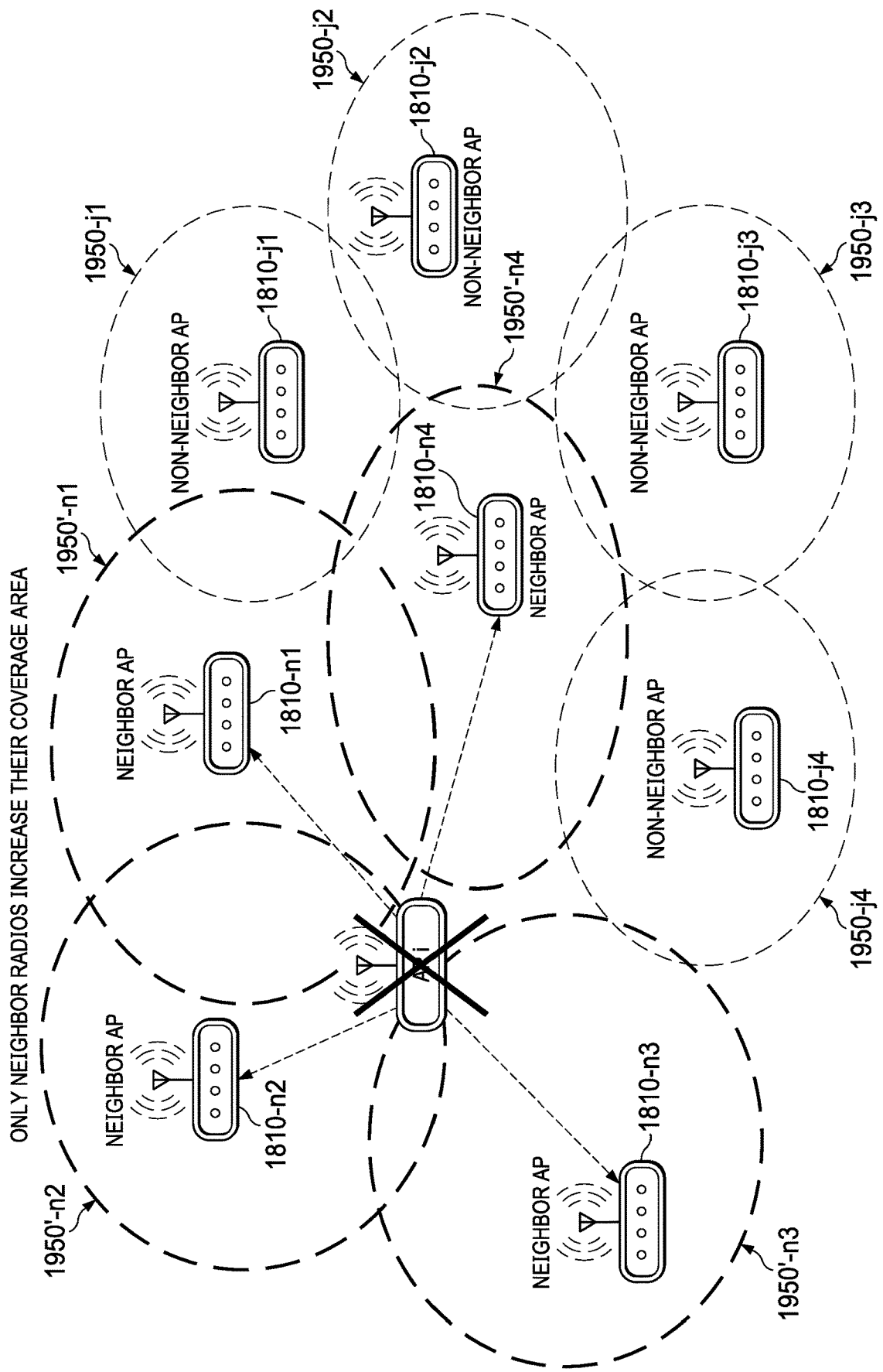

Another significant application of the radio neighbor list is for self-recovery in self-managed wireless networks. For example, to avoid interference, RRM, as a best-practice, sets the transmission power of the radios to the minimum level such that coverage is still satisfactory. With reference to FIGS. 18 and 19A-19B, if a radio 220-($j,i$) of local AP 1810-$i$ fails, this may create a coverage hole 1950-$i$. Knowing the neighbor list of this radio 220-($j,i$), the wireless network controller (e.g., 180) can quickly advise radios of the APs 1810-$n$1, . . . , 1810-$n$4 in the neighbor list to increase their coverage area 1950-$n$1, . . . , 1950-$n$4 (for example, but not limited to, by increasing their transmit power or changing the radiation pattern of the antennas connected to the radio) to another coverage area 1950'-$n$1, . . . , 1950'-$n$4 in order to shrink the coverage hole 1950-$i$. Note that radios of the non-neighbor APs APs 1710-$j$1, . . . , 1710-$j$4 are not instructed to increase their coverage areas 1950-$j$1, . . . , 1950-$j$4. This naturally minimizes the mean time to recovery (MTTR) and the impact of losing a radio while increasing the effectiveness of the recovery procedure because only the radios with overlapped coverage of the APs 1810-$n$1, . . . , 1810-$n$4 are instructed to change their coverage area 1950-$n$1, . . . , 1950-$n$4 to the larger cover area 1950'-$n$1, . . . , 1950'-$n$4. Therefore, as illustrated in FIGS. 19A-19B, the wireless network automatically tried to minimize the coverage hole 1950-$i$.

A few embodiments have been described in detail above, and various modifications are possible. While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Other embodiments fall within the scope of the following claims.

What is claimed is:

1. A wireless network, comprising:
   a plurality of wireless network devices each comprising at least one radio configured to provide wireless services to wireless clients; and
   a distribution communication network for the wireless network devices to exchange information,
   wherein a first wireless network device is configured to collect first information and first measurement from at least one client using the at least one radio in the first wireless network device,
   wherein a second wireless network device is configured to collect second information and second measurements from the at least one client using the at least one radio in the second wireless network device,
   wherein either one or both of the first and second wireless network devices is configured to determine a score about the relationship between the at least one radio in the first wireless network device and the at least one radio the second wireless network device using at least the first information and the second information, and the first measurements and the second measurements,
wherein the first wireless network device is configured to send a first registration message to at least the second wireless network device.

2. The wireless network of claim 1, wherein the client is connected with the at least one radio in the first wireless network device or the at least one radio in the second wireless network device.

3. The wireless network of claim 1, wherein the first information and the second information is a unique client identifier and is the same.

4. The wireless network of claim 1, wherein the first measurement is a first instance of the client receive signal strength (RSS) statistic collected by the at least one radio in the first wireless network device, and the second measurement is a second instance of the client RSS statistic collected by the at least one radio in the second wireless network device.

5. The wireless network of claim 1, wherein the score about the relationship between the radios in the first and second wireless network devices increases when the radios in the first and second wireless network devices have a stronger neighboring relationship.

6. The wireless network of claim 1, wherein the score about the relationship between the radios in the first and second wireless network devices increases if the first and second information and measurements indicates that the client is in the coverage area of both radios in the first and second wireless network devices.

7. The wireless network of claim 1, wherein the score is used to determine a list of neighbor radios for either the first wireless network device or the second wireless network device.

8. The wireless network of claim 1, wherein the second wireless network device is configured to send to the first wireless network device, in response to the first registration message, the second information and second measurement about the at least one client.

9. The wireless network of claim 8, wherein the first wireless network device is configured to determine, based on the list of neighbor radios, a third wireless network device to which to send a registration message.

10. The wireless network of claim 1, wherein the first wireless network device is configured to perform radio resource management tasks based on the score.

11. The wireless network of claim 1, wherein each of the wireless network devices is configured to perform, for each of its at least one radio, a plurality of client load-balancing algorithms, wherein each of the client load-balancing algorithms comprises
    determining whether a radio should steer clients, and if so steering clients toward a target radio, and
    determining the target radio using the score.

\* \* \* \* \*